(12) United States Patent
Kasower

(10) Patent No.: US 8,195,549 B2
(45) Date of Patent: *Jun. 5, 2012

(54) SYSTEMS AND METHODS OF ON-LINE CREDIT INFORMATION MONITORING AND CONTROL

(75) Inventor: Sheldon Kasower, Canoga Park, CA (US)

(73) Assignee: Consumerinfo.com, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/168,736

(22) Filed: Jun. 24, 2011

(65) Prior Publication Data

US 2011/0270727 A1  Nov. 3, 2011

Related U.S. Application Data

(63) Continuation of application No. 12/874,364, filed on Sep. 2, 2010, now Pat. No. 7,970,679, which is a continuation of application No. 10/665,244, filed on Sep. 20, 2003, now Pat. No. 7,792,715.

(60) Provisional application No. 60/412,355, filed on Sep. 21, 2002.

(51) Int. Cl.
*G06Q 40/00* (2006.01)
(52) U.S. Cl. ........................................................ 705/35
(58) Field of Classification Search ................ 705/35–45
See application file for complete search history.

(56) References Cited

U.S. PATENT DOCUMENTS

| | | | |
|---|---|---|---|
| 5,590,038 A | 12/1996 | Pitroda | |
| 5,640,577 A | 6/1997 | Scharmer | |
| 5,659,731 A | 8/1997 | Gustafson | |
| 5,844,218 A | 12/1998 | Kawan et al. | |
| 5,956,693 A | 9/1999 | Geerlings | |
| 5,990,038 A | 11/1999 | Suga et al. | |
| 6,038,551 A | 3/2000 | Barlow et al. | |
| 6,073,140 A | 6/2000 | Morgan et al. | |
| 6,254,000 B1 | 7/2001 | Degen et al. | |
| 6,311,169 B2 | 10/2001 | Duhon | |
| 6,343,279 B1 * | 1/2002 | Bissonette et al. | 705/41 |
| 6,523,041 B1 | 2/2003 | Morgan et al. | |

(Continued)

FOREIGN PATENT DOCUMENTS

WO WO 01/84281 11/2001

OTHER PUBLICATIONS

Paustian, Chuck, "Every Cardholder A King Customers get the full treatment at issuers' Web sites", Card Marketing. New York: Mar. 2001. vol. 5, iss. 2; pp. 1-3.*

(Continued)

*Primary Examiner* — Ella Colbert
*Assistant Examiner* — Mohammad Z Shaikh
(74) *Attorney, Agent, or Firm* — Knobbe, Martens, Olson & Bear, LLP

(57) ABSTRACT

Systems and methods of on-line credit information monitoring and control. In one embodiment, a server computer accesses and retrieves credit information relating to a consumer. The server computer may also provide a user interface with active links associated with credit items. The links may allow the consumer to communicate directly with a credit service. The server computer may offer additional credit-related services such as credit report retrieval, credit monitoring, notifications, identity theft management, interest rate calculations, historical archives, and account management.

31 Claims, 36 Drawing Sheets

U.S. PATENT DOCUMENTS

| | | | |
|---|---|---|---|
| 6,804,346 B1 | 10/2004 | Mewhinney | |
| 6,871,287 B1 | 3/2005 | Ellingson | |
| 6,910,624 B1 | 6/2005 | Natsuno | |
| 6,968,319 B1* | 11/2005 | Remington et al. | 705/40 |
| 6,985,887 B1 | 1/2006 | Sunstein et al. | |
| 6,988,085 B2* | 1/2006 | Hedy | 705/51 |
| 7,028,013 B2 | 4/2006 | Saeki | |
| 7,028,052 B2* | 4/2006 | Chapman et al. | 1/1 |
| 7,209,895 B2 | 4/2007 | Kundtz et al. | |
| 7,234,156 B2 | 6/2007 | French et al. | |
| 7,246,740 B2 | 7/2007 | Swift et al. | |
| 7,249,113 B1* | 7/2007 | Continelli et al. | 705/80 |
| 7,343,295 B2* | 3/2008 | Pomerance | 705/309 |
| 7,370,044 B2 | 5/2008 | Mulhern et al. | |
| 7,403,942 B1 | 7/2008 | Bayliss | |
| 7,433,864 B2 | 10/2008 | Malik | |
| 7,451,113 B1 | 11/2008 | Kasower | |
| 7,458,508 B1 | 12/2008 | Shao | |
| 7,503,489 B2 | 3/2009 | Heffez | |
| 7,509,117 B2 | 3/2009 | Yum | |
| 7,512,221 B2 | 3/2009 | Toms | |
| 7,529,698 B2 | 5/2009 | Joao | |
| 7,542,993 B2 | 6/2009 | Satterfield | |
| 7,548,886 B2 | 6/2009 | Kirkland et al. | |
| 7,575,157 B2 | 8/2009 | Barnhardt et al. | |
| 7,584,146 B1 | 9/2009 | Duhon | |
| 7,610,216 B1 | 10/2009 | May et al. | |
| 7,620,596 B2 | 11/2009 | Knudson et al. | |
| 7,623,844 B2 | 11/2009 | Herrmann et al. | |
| 7,653,600 B2 | 1/2010 | Gustin | |
| 7,672,833 B2 | 3/2010 | Blume et al. | |
| 7,689,487 B1 | 3/2010 | Britto et al. | |
| 7,689,505 B2 | 3/2010 | Kasower | |
| 7,690,032 B1 | 3/2010 | Peirce | |
| 7,708,190 B2 | 5/2010 | Brandt et al. | |
| 7,725,385 B2* | 5/2010 | Royer et al. | 705/38 |
| 7,761,384 B2 | 7/2010 | Madhogarhia | |
| 7,769,697 B2 | 8/2010 | Fieschi et al. | |
| 7,793,835 B1 | 9/2010 | Coggeshall | |
| 7,841,004 B1 | 11/2010 | Balducci | |
| 7,849,014 B2 | 12/2010 | Erikson | |
| 7,966,192 B2* | 6/2011 | Pagliari et al. | 705/1.1 |
| 2001/0044729 A1* | 11/2001 | Pomerance | 705/1 |
| 2002/0010591 A1* | 1/2002 | Pomerance | 705/1 |
| 2002/0069122 A1 | 6/2002 | Yun et al. | |
| 2002/0077964 A1* | 6/2002 | Brody et al. | 705/38 |
| 2002/0128962 A1 | 9/2002 | Kasower | |
| 2002/0169747 A1 | 11/2002 | Chapman et al. | |
| 2002/0173994 A1* | 11/2002 | Ferguson, III | 705/4 |
| 2003/0009418 A1 | 1/2003 | Green et al. | |
| 2003/0009426 A1 | 1/2003 | Ruiz-Sanchez | |
| 2003/0046223 A1* | 3/2003 | Crawford et al. | 705/38 |
| 2003/0061163 A1 | 3/2003 | Durfield | |
| 2003/0097380 A1 | 5/2003 | Mulhern et al. | |
| 2003/0115133 A1 | 6/2003 | Bian | |
| 2003/0171942 A1 | 9/2003 | Gaito | |
| 2003/0195859 A1 | 10/2003 | Lawrence | |
| 2003/0233292 A1* | 12/2003 | Richey et al. | 705/28 |
| 2004/0024709 A1* | 2/2004 | Yu et al. | 705/43 |
| 2004/0167793 A1 | 8/2004 | Masuoka et al. | |
| 2004/0193891 A1 | 9/2004 | Ollila | |
| 2004/0230527 A1 | 11/2004 | Hansen et al. | |
| 2005/0027983 A1 | 2/2005 | Klawon | |
| 2005/0058262 A1 | 3/2005 | Timmins et al. | |
| 2005/0154665 A1 | 7/2005 | Kerr | |
| 2006/0041464 A1 | 2/2006 | Powers et al. | |
| 2006/0059110 A1 | 3/2006 | Madhok et al. | |
| 2006/0074986 A1 | 4/2006 | Mallalieu et al. | |
| 2006/0129481 A1 | 6/2006 | Bhatt et al. | |
| 2006/0161435 A1 | 7/2006 | Atef et al. | |
| 2006/0229943 A1 | 10/2006 | Mathias et al. | |
| 2006/0229961 A1 | 10/2006 | Lyftogt et al. | |
| 2006/0253358 A1 | 11/2006 | Delgrosso et al. | |
| 2006/0262929 A1 | 11/2006 | Vatanen et al. | |
| 2006/0271457 A1 | 11/2006 | Romain et al. | |
| 2007/0005508 A1 | 1/2007 | Chiang | |
| 2007/0027816 A1 | 2/2007 | Writer | |
| 2007/0073889 A1 | 3/2007 | Morris | |
| 2007/0078985 A1 | 4/2007 | Shao et al. | |
| 2007/0083460 A1 | 4/2007 | Bachenheimer | |
| 2007/0112667 A1 | 5/2007 | Rucker | |
| 2007/0124256 A1 | 5/2007 | Crooks et al. | |
| 2007/0174186 A1 | 7/2007 | Hokland | |
| 2007/0174448 A1 | 7/2007 | Ahuja et al. | |
| 2007/0288355 A1 | 12/2007 | Roland et al. | |
| 2008/0010206 A1 | 1/2008 | Coleman | |
| 2008/0010687 A1 | 1/2008 | Gonen et al. | |
| 2008/0071682 A1 | 3/2008 | Dominguez | |
| 2008/0103972 A1 | 5/2008 | Lanc | |
| 2008/0175360 A1 | 7/2008 | Schwarz et al. | |
| 2008/0183480 A1 | 7/2008 | Carlson et al. | |
| 2008/0255992 A1 | 10/2008 | Lin | |
| 2008/0281737 A1 | 11/2008 | Fajardo | |
| 2008/0288299 A1 | 11/2008 | Schultz | |
| 2009/0006230 A1 | 1/2009 | Lyda et al. | |
| 2009/0037332 A1 | 2/2009 | Cheung et al. | |
| 2009/0106141 A1 | 4/2009 | Becker | |
| 2009/0106150 A1 | 4/2009 | Pelegero et al. | |
| 2009/0177529 A1 | 7/2009 | Hadi | |
| 2009/0210241 A1 | 8/2009 | Calloway | |
| 2009/0260064 A1 | 10/2009 | Mcdowell et al. | |
| 2009/0307778 A1 | 12/2009 | Mardikar | |
| 2010/0043055 A1 | 2/2010 | Baumgart | |
| 2010/0114744 A1 | 5/2010 | Gonen | |
| 2010/0114776 A1 | 5/2010 | Weller et al. | |
| 2010/0145840 A1 | 6/2010 | Baker et al. | |
| 2010/0153278 A1 | 6/2010 | Farsedakis | |
| 2010/0179906 A1 | 7/2010 | Hawkes | |
| 2010/0241535 A1 | 9/2010 | Nightengale et al. | |
| 2010/0250364 A1 | 9/2010 | Song et al. | |
| 2010/0280914 A1 | 11/2010 | Carlson | |
| 2011/0035788 A1 | 2/2011 | White et al. | |

OTHER PUBLICATIONS

Anonymous, "Credit-report disputes await electronic resolution", Credit Card News. Chicago: Jan. 15, 1993, vol. 5, iss. 19, pp. 1-2.*

Anonymous, "MBNA offers resolution of credit card disputes", New York State Dental Journal. Hempstead: Feb. 2002. vol. 68, iss. 2; p. 47, 1 pgs.*

"Consumers Gain Immediate and Full Access to Credit Score Used by Majority of U.S. Lenders", PR Newswire. New York: Mar. 19, 2001. pp. 1-3.*

Next Card: About Us. (copyright 1997-2001),. pp. 1-10.*

U.S. Appl. No. 12/220,320, filed Jul. 23, 2008, Olof et al.

U.S. Appl. No. 12/220,320, filed Jul. 23, 2008, Brunzell et al.

U.S. Appl. No. 12/705,489, filed Feb. 12, 2010, Bargoli et al.

U.S. Appl. No. 12/705,511, filed Feb. 12, 2010, Bargoli et al.

Ettorre, Paul Kahn on Exceptional Marketing. Management Review, vol. 38(11), Nov. 1994, pp. 48-51.

Ideon, Credit-Card Registry That Bellyflopped this Year, Is Drawing some Bottom-Fishers, The Wall Street Journal, Aug. 21, 1995, p. C2.

* cited by examiner

CREDITWATCH

⊙ HOME    ⓘ LEARN MORE    ⊕ SECURITY    ⑦ PRIVACY

Your Creditwatch Membership Includes:
- One year of Membership Services at Creditwatch.Com
- Online TransUnion Credit Report
- Online TransUnion Credit Score and Analysis
- Online Credit Monitoring with Email Alerts [more...]
- Tools for Reporting Credit Report inaccuracies with the click of a button
- Credit Protection Services [more...]
- ID Theft Assistance [more...]
- Unlimited Access to Detailed Archives of all Services. Reports and Scores for recordkeeping purposes
- Unlimited Ordering* of Online Credit Reports from all 3 Bureaus** including 3.Bureau Merged Reports
- Unlimited Ordering* of Online Credit Scores and Analyses
- Access to many credit and financial tools, information, special offers from partners and related services
- May incur additional charge for additional reports and/or

REGISTER

PAGE 1 OF 2

FIELDS MARKED WITH * ARE REQUIRED. THIS SERVISE IS AVAILABLE TO US RESIDETS ONLY.

FULL NAME: [YOUR FIRST NAME]* [MIDDL] [YOUR LAST NAME]*

ADDRESS: [ADDRESS 1]*
[ADDRESS 2]

CITY TOWN: [CITY]*

STATE: [(NO STATE SELECTED) ▼]*

ZIP CODE: [ZIP CODE]*

EMAIL ADDRESS: [EMAIL ADDRESS]*

TELEPHONE: [ ]*

HOW DID YOU HEAR ABOUT US? [PLEASE MAKE A SELECTION... ▼]

CREDITWATCH

◎ HOME  ⊕ LEARN MORE  ⊕ SECURITY  ⊕ PRIVACY

Your Creditwatch Membership Includes:
- One year of Membership Services at
  - Creditwatch.Com
  - Online TransUnion Credit Report
  - Online TransUnion Credit Score and Analysis
  - Online Credit Monitoring with Email Alerts [more....]
- Tools for Reporting Credit Report inaccuracies with the click of a button
  - Credit Protection Services [more....]
- ID Theft Assistance
- Unlimited Access to Detailed Archives of all Services, Reports and Scores for recordkeeping purposes
- Unlimited Ordering* of Online Credit Reports from all 3 Bureaus** including 3.Bureau Merged Reports
- Unlimited Ordering* of Online Credit Scores and Analyses
- Access to many credit and financial tools, information, special offers from partners and related services
- May incur additional charge for additional reports and/or

REGISTER (CONTINUE)
PAGE 2 OF 2

SECURITY INFORMATION:

DATE OF BIRTH: ☐ ☐ ☐    EXAMPLE: 02 04 1974

SSN: ☐    EXAMPLE: 111223333

CONFIRM SSN: ☐

DESIRED USER NAME: ☐

DESIRED PASWORD: ☐

PLEASE INDICATE YOUR ACCEPTANCE OF THE TERMS & CONDITIONS BY CLICKING "I ACCEPT" BELOW.

○ I ACCEPT    ○ I DECLINE

[FINISH]

FIG. 3B

| REPORTS/SCORES | MONITORING | NOTIFICATIONS | IDENTITY THEFT | ARCHIVES | YOUR INTEREST RATES | ACCOUNT |

CREDITWATCH

ⓗ HOME  ⓘ LEARN MORE  ⓢ SECURITY  ⓟ PRIVACY

WEDNESDAY SEPTEMBER 10, 2003

HELLO, JOHN SHINN!

ACCOUNT SUMMARY:

CREDIT REPORTS/SCORES:
- EXPERIAN - 4/01/03     N A
- EQUIFAX - 02/28/03     N A
- MERGED 3 BUREAU - 04/01/03    643

CREDIT MONITORING:
- NEW ACTIVITY - 04/01/03        NEW INQUIRY
- LAST ACTIVITY - 06/25/02       ADDRESS CHANGE

NOTIFICATIONS
- LAST ACTIVITY - 08/1/02        LOST CARD(S) REPORTED

Identity Theft is on the rise. Make sure you are regularly checking for the warning signs that you've become a victim!

Clean that credit report! It's vital to stay on top of your credit and make sure there are no inaccuracies in your file. Click here to make sure your file is up to date.

ⓘ FAQ
ⓘ Refer a friend

Important Notices:
- You have never ordered a TransUnion credit report. Click here to order one now.
- Your credit score is low. Please click here for tips on improving this score.
- New Credit Monitoring information has arrived as of 04/01/03. Click here to view it.

FIG. 3C

| REPORTS/ SCORES | MONITORING | NOTIFICATIONS | IDENTITY THEFT | ARCHIVES | YOUR INTEREST RATES | ACCOUNT |
|---|---|---|---|---|---|---|

CREDITWATCH

◎ HOME    ⊞ LEARN MORE    ⊕ SECURITY    @ PRIVACY

Identity Theft is on the rise. Make sure you are regularly checking for the warning signs that you've become a victim!

Clean that credit report! It's vital to stay on top of your credit and make sure there are no inaccuracies in your file. Click here to make sure your file is up to date.

○ FAQ
○ Refer a friend

---

REQUEST NEW REPORT

PLEASE VERIFY THE FOLLOWING:

PERSONAL INFORMATION:
NAME: JOHN SHINN
SOCIAL SECURITY NUMBER: 121-23-4343
DATE OF BIRTH: 02/09/1949
CLICK HERE IF ANY OR THE ABOVE INFORMATION IS NOT CORRECT.

CONTACT INFORMATION:
E-MAIL: JOHN.SHINN@ATYOURPLACE.COM
DAYTIME PHONE NUMBER: (800)999-1212
EVENING PHONE NUMBER: (800)343-5656
CURENT ADDRESS: 5090 GOOSE STR SAN VALLEY S7G UK
CLICK HERE IF ANY OR THE ABOVE INFORMATION ISNOT CORRECT.

CREDIT CARD INFORMATION:
CREDIT CARD: DISCOVER
CARD NUMBER: 4IIIIIIIIIIIIIIII
EXPIRATION DATE: 04/09
CARD HOLDER FIRST NAME: JOHN
CARD HOLDER LAST NAME: SHINN
CLICK HERE IF ANY OR THE ABOVE INFORMATION IS NOT CORRECT.

DELIVER OPTIONS:

FIG.5A

```
PUBLIC RECORD INFORMATION (Id) Bur  Court and Tax Recordings:
     ---------------------------------

(01) EFX  FORECLOSURE FILED; STATUS UNKNOWN; REPORTED IN 05-96.
 CI:  N AMER MTG 2379 BRIARWEST 98 HOU, DK: 61674)

================================ END DEROGATORY ITEMS ================================

Account Name/Number/Type of Account
Credit   Bureau  Date    High/   Mthly  Account  Last  Account  Past   Last    Past Due    Hist    Hist
(Id) Bur  Code   Open    Limit   Pymt   Balance  Rptd  Status   Due    Amt     30 60 90+   Date    Acct Stat
                                                              Status   Due    Delng
                                                                                   ╭─53

BOSTON NATIONAL TRUST /542xxxx REVOLVING
(01) EFX  I  06-85   400     N/A     -0-      04-97  CURRENT  [REPORT INACCURACY]  00 00 00   04-97   111111111

FOURTH NATIONAL BK VSA /400011xxxxxx REVOLVING
(01) EFX  I  12-92   400     N/A     -0-      04-97  CURRENT  [REPORT INACCURACY]  00 00 00   04-97   111111111

FOURTH NATIONAL BK /287000xxxxxx REVOLVING
(01) EFX  I  01-92   400     N/A     -0-      04-97  CURRENT  [REPORT INACCURACY]  00 00 00   04-97   111111111

FREDERICK & NELSON /52xx REVOLVING
(01) EFX  I  04-89   112     N/A     -0-      04-97  CURRENT  [REPORT INACCURACY]  00 00 00   04-97   111111111

GMAC /FSAxxx INSTALLMENT
(01) EFX  J  07-89  4936     137     -0-      09-90  CURRENT  [REPORT INACCURACY]  00 00 00   09-90   111111111

NATIONAL MORTG CORP /740000xxxxxx REAL ESTATE
(01) EFX  I  04-96  94000    962   94000      04-97  CURRENT  [REPORT INACCURACY]  00 00 00   04-97   111111111

NORDSTROMS /7770xxxx REVOLVING
(01) EFX  I  03-91   405     N/A     -0-      01-92  CURRENT              00 00 00   01-92

RECENT INQUIRIES INTO YOUR CREDIT FILE (Id) Bur  Date    Abbreviated Company Name:
     ----------------------------------------
```

FIG. 5B

| REPORTS/ SCORES | MONITORING | NOTIFICATIONS | IDENTITY THEFT | ARCHIVES | YOUR INTEREST RATES | ACCOUNT |

CREDITWATCH

⊙ HOME   ⊞ LEARN MORE   ⊕ SECURITY   @ PRIVACY

FIG.5c

Identity Theft is on the rise. Make sure you are regularly checking for the warning signs that you've become a victim Clean that credit report! It's vital to stay on top of your credit and make sure there are no inaccuracies in your file. Click here to make sure your file is up to date.

○ FAQ

○ Refer a friend

634

850: HIGHES SCORE

100%

EXCELLENT

GOOD

FAIR

POOR

YOU ARE HERE

0%  350 LOWEST SCORE

WHAT YOUR SCORE MEANS

Your credit rating ranks higher than 30% of U.S. consumers.

Currently, your CreditXpert Credit Score (tm) will make it difficult for you to get the best offers from lenders, especially for credit cards. Be prepared to pay higher fees and interest rates and/or to make a deposit of down payment. Also, you may not be able to get high credit limits and loan amounts. However, if you demonstrate that you are reliable by paying your bills on time, your credit score can improve significantly.

Both negative and positive factors influence your credit score. The most important factors of each are listed below, in order of importance. Remember, these factors vary in how strongly they impact your credit score. For example, if you have a very high credit score, the negative factors in your analysis are likely to have a small impact. The same is true for positive factors if you have a very low credit score.

| Here are the top factors that make your score lower: | Here are the top factors that make your score higher: |
|---|---|
| Credit usage | Payment history |
| On average, you are using 104% of your credit limit on your credit card(s). This only includes your open accounts for which the credit limit/loan amount is available. | Last reported month, you paid all of your accounts on time. This only includes accounts updated in the past 3 months. |

REPORT INACCURACY

COMPANY NAME: BOSTON NATIONAL TRUST

ACCOUNT NUMBER: 542XXXX

REASON FOR DISPUTE:
- ◉ THIS IS NOT MY ACCOUNT
- ○ I HAVE NEVER PAID LATE
- ○ THIS ACCOUNT IS IN BANKRUPTCY
- ○ THIS ACCOUNT IS CLOSED
- ○ I HAVE PAID THIS ACCOUNT IN FULL
- ○ I PAID THIS BEFORE IT WENT TO COLLECTION OR BEFORE IT WAS CHARGED OFF
- ○ OTHER [         ]

[CANCEL]   [GENERATE INACCURACY REPORT]

FIG. 5D

| REPORTS/ SCORES | MONITORING | NOTIFICATIONS | IDENTITY THEFT | ARCHIVES | YOUR INTEREST RATES | ACCOUNT |
|---|---|---|---|---|---|---|
| CREDITWATCH | ⊚ HOME  ⊕ LEARN MORE  ⊕ SECURITY  ⓟ PRIVACY | | | | | |

Identity Theft is on the rise. Make sure you are regularly checking for the warning signs that you've become a victim!

Clean that credit report! It's vital to stay on top of your credit and make sure there are no inaccuracies in your file. Click here to make sure your file is up to date.

○ FAQ
○ Refer a friend

MONITORING ACTIVITY-TRADELINES

| | |
|---|---|
| INDUSTRY CODE: | BC |
| SUBSCRBER NAME: | ANB  CITIBANK  SD |
| ACCOUNT TYPE: | R |
| ACCOUNT NUMBER: | 462120118158 |
| BALANCE: | 000013131 |
| CURENT MANNER OF PAYMENT: | 01 |
| PREVIOUS MANNER OF PAYMENT: | 04 |
| CURRENT AMOUNT PAST DUE: | 04 |
| REMARKS: | CBG |
| METHOD OF CONTACT: | O |

FIG.7A

| REPORTS/ SCORES | MONITORING | NOTIFICATIONS | IDENTITY THEFT | ARCHIVES | YOUR INTEREST RATES | ACCOUNT |
|---|---|---|---|---|---|---|

CREDITWATCH

⊙ HOME   ⊕ LEARN MORE   ⊚ SECURITY   ⊘ PRIVACY

Identity Theft is on the rise. Make sure you are regularly checking for the warning signs that you've become a victim!

Clean that credit report! It's vital to stay on top of your credit and make sure there are no inaccuracies in your file. Click here to make sure your file is up to date.

MONITORING ACTIVITY - ADDRESSES

| ADDRESS 1 : | P O BOX 15687 |
|---|---|
| ADDRESS 2 : | |
| CITY : | WILMINGTON |
| STATE : | DE |
| ZIP : | 19850 |

○ FAQ

○ Refer a friend

FIG. 7B

| REPORTS/ SCORES | MONITORING | NOTIFICATIONS | IDENTITY THEFT | ARCHIVES | YOUR INTEREST RATES | ACCOUNT |
|---|---|---|---|---|---|---|

⊙ HOME  ⊕ LEARN MORE  ⊕ SECURITY  ⊕ PRIVACY

CREDITWATCH

Identity Theft is on the rise. Make sure you are regularly checking for the warning signs that you've become a victim!

Clean that credit report! It's vital to stay on top of your credit and make sure there are no inaccuracies in your file. Click here to make sure your file is up to date.

o FAQ
o Refer a friend

MONITORING ACTIVITY

| EMPLOYER: | JUST 4 DOCTORS LLC |
|---|---|
| OCCUPATION: | |
| DATE HIRED: | |
| DATE SEPARATED: | |
| DATE CODE: | |
| INCOME: | |
| PAY BASIS: | |

FIG. 7C

| REPORTS/ SCORES | MONITORING | NOTIFICATIONS | IDENTITY THEFT | ARCHIVES | YOUR INTEREST RATES | ACCOUNT |
|---|---|---|---|---|---|---|
| CREDITWATCH | ⊙ HOME | ⊕ LEARN MORE | ⊕ SECURITY | ⊕ PRIVACY | | |

Identity Theft is on the rise. Make sure you are regularly checking for the warning signs that you've become a victim!

Clean that credit report! It's vital to stay on top of your credit and make sure there are no inaccuracies in your file. Click here to make sure your file is up to date.

○ FAQ
○ Refer a friend

MONITORING ACTIVITY

| INQUIRY SEGMENT: | |
| --- | --- |
| INDUSTRY CODE: | F |
| SUBSCRIBER NAME: | GREENLIGHTFI/GREENLIGHTF |
| INQUIRY TYPE: | DE |
| LOAN TYPE: | 19850 |
| LOAN AMOUNT: | PO BOX 15687 |
| INQUIRY DATE: | |
| SUBSCRIBER ADDRESS SEGMENT: | WILMINGTON |
| ADDRESS 1: | 2600 MICHELSON DR |
| ADDRESS 2: | DR #650 |
| CITY: | IRVINE |
| STATE: | CA |
| ZIP: | 92612 |

FIG.7D

| REPORTS/ SCORES | MONITORING | NOTIFICATIONS | IDENTITY THEFT | ARCHIVES | YOUR INTEREST RATES | ACCOUNT |
|---|---|---|---|---|---|---|

CREDITWATCH

ⓞ HOME   ⓘ LEARN MORE   ⓢ SECURITY   ⓟ PRIVACY

*MONITORING ACTIVITY - NEW PUBLIC RECORD*

| PUBLIC RECORD SEGMENT: | |
|---|---|
| PR TYPE: | 7F |
| DOCKET: | 200002444 |
| ATTORNEY: | SMITH & JACKSON |
| PLAINTIFF: | C&C |
| DATE REPORTED: | 20000301 |
| ASSETS: | |
| LIABILITIES: | 19850 |
| ACCT. TYPE: | 1 |
| COURT TYPE: | BK |
| CITY: | CHICAGO |
| STATE: | IL |

Identity Theft is on the rise. Make sure you are regularly checking for the warning signs that you've become a victim!

Clean that credit report! It's vital to stay on top of your credit and make sure there are no inaccuracies in your file. Click here to make sure your file is up to date.

o FAQ
o Refer a friend

| REPORTS/ SCORES | MONITORING | NOTIFICATIONS | IDENTITY THEFT | ARCHIVES | YOUR INTEREST RATES | ACCOUNT |

CREDITWATCH

◎ HOME    ⊕ LEARN MORE    ⊕ SECURITY    ⊕ PRIVACY

ID THEFT QUESTIONNAIRE

PERSONAL INFORMATION _____ PAGE 1 OF 6

Identity Theft is on the rise. Make sure you are regularly checking for the warning signs that you've become a victim!

Clean that credit report! It's vital to stay on top of your credit and make sure there are no inaccuracies in your file. Click here to make sure your file is up to date.

○ FAQ
○ Refer a friend

PLEASE CONFIRM THE FOLLOWING:

FIRST NAME: [          ]

LAST NAME: [          ]

STREET ADDRESS: [          ]

APT. OR SUITE NO.: [          ]

CITY: [          ]

STATE/PROVINCE: [   ▼]

ZIP: [   ]-[   ]

HOME PHONE: [   ]-[   ]-[   ]
(AREA CODE)(PHONE NUMBER)
(NUMBERS ONLY)

WORK PHONE: [   ]-[   ]-[   ]  EXT. [   ]
(AREA CODE)(PHONE NUMBER)
(EXTENSION)(NUMBERS ONLY)

SOCIAL SECURITY NO.: [   ]-[   ]-[   ]    DATE OF BIRTH: [          ] MM/DD/YYYY

EMAIL ADDRESS: [          ]  (I.E., ANYONE@MYISP.COM)

[ SAVE -- FINISH LATER ]    [ CONTINUE ]

| REPORTS/ SCORES | MONITORING | NOTIFICATIONS | IDENTITY THEFT | ARCHIVES | YOUR INTEREST RATES | ACCOUNT |
|---|---|---|---|---|---|---|

CREDITWATCH

⊙ HOME   ⊕ LEARN MORE   ① SECURITY   ② PRIVACY

Identity Theft is on the rise. Make sure you are regularly checking for the warning signs that you've become a victim!

Clean that credit report! It's vital to stay on top of your credit and make sure there are no inaccuracies in your file. Click here to make sure your file is up to date.

○ FAQ
○ Refer a friend

ID THEFT QUESTIONNAIRE
PAGE 2 OF 6

COMPLAINT OVERVIEW

Types of Identity Theft You Have Experienced,

ID Theft occurs when someone uses your name or other identifying information for their personal gain. Please check the types of ID theft you were a victim of. (Check as many as apply)

☐ Credit Cards                    ☐ Securities or Other Investments

☐ Checking or Savings Accounts    ☐ Internet or E-mail

☐ Loans                           ☐ Government Documents or Benefits

☐ Phone or Utilities              ☐ Other

Did suspect use the Internet to open the account or purchase the goods or services?
○ Yes
○ No
● Don't Know Describe Your Complaint Here.

Please give us information about the identity theft, including, but not limited to, how the theft occurred, who may be responsible for the theft, and what actions you have taken since the theft. Please include a list of companies where fraudulent accounts were established or your current accounts were affected. Please limit your complaint to 2000 characters.

FIG. 9B

| REPORTS/ SCORES | MONITORING | NOTIFICATIONS | IDENTITY THEFT | ARCHIVES | YOUR INTEREST RATES | ACCOUNT |
|---|---|---|---|---|---|---|

CREDITWATCH  ⊙ *HOME*  ⊕ *LEARN MORE*  ⊕ *SECURITY*  ⊕ *PRIVACY*

ID THEFT QUESTIONNAIRE

COMPLAINT DETAILS ————————————— PAGE 3 OF 6

DETAILS OF THE IDENTITY THEFT.

Identity Theft is on the rise. Make sure you are regularly checking for the warning signs that you've become a victim!

When did you notice that you might be a victim of identity theft?
[        ] (MM/DD/YYYY)

When did the identity theft occur? (i.e., when was the first account opened?):
[        ] (MM/DD/YYYY)

Clean that credit report! It's vital to stay on top of your credit and make sure there are no inaccuracies in your file. Click here to make sure your file is up to date.

How many accounts (credit cards, loans, bank accounts, cellular phone accounts, etc.) were opened or accessed?
[        ] (Numbers Only)

How much money, if any, have you had to pay?
[        ] (Numbers Only)

How much money, if any, did the identity thief obtain from companies in your name?

What other problems, if any, have you experienced as a result of the identity theft? (Click on the down arrow. To select more than one, hold down the CTRL key while clicking your selection).

o  FAQ
o  Refer a friend

| No Other Harm Suffered |
|---|
| Civil Suit Filed or Judgment Entered Against You |
| Criminal Investigation, Arrest or conviction |
| Denied Credit or Other Financial Services |
| Denied Employment or Loss of Job |

◀ ▶

Save - Finish Later          Continue

*FIG. 9c*

| REPORTS/ SCORES | MONITORING | NOTIFICATIONS | IDENTITY THEFT | ARCHIVES | YOUR INTEREST RATES | ACCOUNT |

CREDITWATCH  ⊙ HOME  ⊞ LEARN MORE  ⊛ SECURITY  ⊛ PRIVACY

ID THEFT QUESTIONNAIRE ———————————— PAGE 4 OF 6
COMPLAINT DETAILS

THE IDENTITY THIEF INFO.

PLEASE PROVIDE ANY INFORMATION YOU MAY HAVE ABOUT THE IDENTITY THIEF, INCLUDING HIS OR HER NAME, AND ANY ADDRESSES OR PHONE NUMBERS THE IDENTITY THIEF MAY HAVE USED.

Identity Theft is on the rise. Make sure you are regularly checking for the warning signs that you've become a victim!

Clean that credit report! It's vital to stay on top of your credit and make sure there are no inaccuracies in your file. Click here to make sure your file is up to date.

○ FAQ
○ Refer a friend

FIRST NAME:  [        ]
LAST NAME:  [        ]
STREET ADDRESS:  [        ]
APT. OR SUITE NO:  [        ]
CITY:  [        ]
STATE/PROVINCE:  [        ]
ZIP:  [     ] - [     ]
HOME PHONE:  [     ] - [        ]
(AREA CODE)(PHONE NUMBER)
(NUMBERS ONLY)
SOCIAL SECURITY NO.: [   ] - [   ] - [        ]   DATE OF BIRTH: [   ] - [   ] - [      ] (MM/DD/YYYY)
EMAIL ADDRESS: [                    ]  I.E., ANYONE@MYISP.COM
YOUR RELATIONSHIP TO THE IDENTITY THIEF: [        ▼]

WORK PHONE: [   ] [        ] EXT. [    ]
(AREA CODE)(PHONE NUMBER)
(EXTENSION)(NUMBERS ONLY)

FIG. 9D

| REPORTS/ SCORES | MONITORING | NOTIFICATIONS | IDENTITY THEFT | ARCHIVES | YOUR INTEREST RATES | ACCOUNT |
|---|---|---|---|---|---|---|

CREDITWATCH            ⓒ *HOME*   ⓘ *LEARN MORE*   ⓢ *SECURITY*   ⓟ *PRIVACY*

Identity Theft is on the rise. Make sure you are regularly checking for the warning signs that you've become a victim!

Clean that credit report! It's vital to stay on top of your credit and make sure there are no inaccuracies in your file. Click here to make sure your file is up to date.

○ FAQ

○ Refer a friend

*ID THEFT QUESTIONNAIRE*

*PROBLEMS WITH COMPANIES* —————— *PAGE 5 OF 6*

Do you have any problems with the companies, credit bureaus, or organizations you are dealing with concerning your identity theft problems? If so, identify each company, credit bureau, or organization, provide its location and/or telephone number, if you have it, and tell us briefly what the problem is.

Company 1

Company Name: [         ]

City: [         ]

State/Province: [     ▶]

Zip: [   ] - [    ] (Numbers Only)

Home Phone: [   ] [    ] Ext. [   ] (Area Code)(Phone Number)(Extension)

Have you notified this company?  ○ Yes  ○ No

Have you sent written notifications to this company?  ○ Yes  ○ No

Company 2

Company Name: [         ]

City: [         ]

FIG. 9E

| REPORTS/ SCORES | MONITORING | NOTIFICATIONS | IDENTITY THEFT | ARCHIVES | YOUR INTEREST RATES | ACCOUNT |
|---|---|---|---|---|---|---|

CREDITWATCH  ⊙ HOME  ⊕ LEARN MORE  ⊕ SECURITY  ⊕ PRIVACY

Identity Theft is on the rise. Make sure you are regularly checking for the warning signs that you've become a victim!

Clean that credit report! It's vital to stay on top of your credit and make sure there are no inaccuracies in your file. Click here to make sure your file is up to date.

○ FAQ
○ Refer a friend

ID THEFT QUESTIONNAIRE

REVIEW AND SUBMIT _____ PAGE 6 OF 6

PLEASE REVIEW ALL INFORMATION YOU PROVIDED IN THIS ID THEFT QUESTIONNAIRE AND SUBMIT IT BY CLICKING ON SUBMIT BUTTON BELOW.

⊞ PERSONAL INFORMATION                    *EDIT*

⊞ COMPLAINT OVERVIEW                       *EDIT*

⊞ DETAILS OF IDENTITY THEFT                *EDIT*

⊞ THE IDENTITY THIEF INFO                  *EDIT*

⊞ PROBLEMS WITH COMPANIES                  *EDIT*

[SUBMIT]  [SAVE--FINISH LATER]  [CANCEL]

*FIG. 9F*

Instructions for completing your ID Notification.

Very Important! Please follow these instructions.

Print them out for reference.

(1) The letter you see after closing this window must be printed, signed and mailed to your local police department at the address indicated on the letter. This is to establish the identity as a genuine occurrence and should result in a police report being filed with your local police department.

We highly recommend sending the letter via registered or return receipt mail along with copies of any supporting documentation.

(2) Mail copies to all three major credit bureaus (TransUnion, Equifax and Experian) at the address indicated at the bottom of the letter.

(3) Mail a copy of the letter to any credit grantor(s) involved in the suspected identity theft.

(4) Keep a copy of this letter for your files.

A summary of this report has been automatically filed with the FTC/Consumer Sentinel national identity theft database and the FBI.

A copy of this letter is maintained in your archives and can be reprinted at any time.

Our ID Theft Notification Letter has been generated.
To view it's printable version click here

San Simeon Metro Police Department
123 Main Street
San Simeon, CA 93287
Attn: Fraud Department Subject: Identity Theft Incident Report To Whom It May Concern:

Please be advised that I have recently become a victim of identity theft. The details of my incident are reported in this letter. Please contact me immediately to process my police report for this incident.

Personal Information

| | |
|---|---|
| First Name: | John |
| Last Name: | Shinn |
| Address: | 2865 SE 101ST AV, PORTLAND, DE 97011 |
| Home Phone: | 323-998-0989 |
| Work Phone: | 818-556-8765 |
| Social Security Number: | 111-22-3333 |
| Date Of Birth: | 12/31/65 |
| Email Address: | john.shinn@aol.com |

Complaint Overview

| | |
|---|---|
| Types of Identity Theft You Have Experienced. | Credit Cards |
| Suspected use of the Internet to open the account or purchase the goods or services | Yes |
| Description of Complaint | This account is in bankruptcy. |

Details of the Identity Theft

| | |
|---|---|
| The date you noticed that you might be a victim of identity theft. | 02/17/03 |
| The date the identity theft first occurred. | 06/21/02 |
| The number of accounts (credit cards, loans, bank accounts, cellular phone accounts, etc.) opened or accessed. | 2 |
| Amount of money, if any, have you had to pay. | 400 |
| Amount of money, if any, the identity thief obtained from companies in your name. | 200 |
| Other problems, if any, have you experienced as a result of the identity theft | Denied Employment or Loss of Job |

The Identity Thief Info

| | |
|---|---|
| First Name | Marsha |
| Last Name | Kaplan |
| Address | 2340 Cirius Str. Hidden Valley, CA 90087 |
| Home Phone: | 323-998-0989 |
| Work Phone: | Unknown |
| Social Security Number: | Unknown |
| Date Of Birth: | Unknown |
| Email Address: | supergirlmarsha@yahoo.com |
| Relationship to the identity thief: | Roommate/Co-habitant |

Problems with Companies

| | |
|---|---|
| Company Name | Trans Union |
| Address | P.O. Box 97328 Jackson, MS 39288-7328 |
| Phone | 800-888-4213 |
| Have you notified this company? | Yes |
| Have you sent written notifications to this company? | Yes |

Sincerely,

John Shinn cc:

Equifax
123 Main Str.
New York, New York 76890

TransUnion
P.O. Box 97328
Jackson, MS 39288-7328

Experian
P.O. Box 78666
Georgina, GA 89000-3453

FIG. 9I

| REPORTS/ SCORES | MONITORING | NOTIFICATIONS | IDENTITY THEFT | ARCHIVES | YOUR INTEREST RATES | ACCOUNT |
|---|---|---|---|---|---|---|

CREDITWATCH

@HOME  @LEARN MORE  @SECURITY  @PRIVACY

ID THEFT NOTIFICATIONS

Identify Theft is on the rise. Make sure you are regularly checking for the warning signs that you've become a victim!

Clean that credit report! It's vital to stay on top of your credit and make sure there are no inaccuracies in your file. Click here to make sure your file is up to date.

| 6/1/03 | VIEW DETAILS |
| --- | --- |
| 8/5/03 | NOT COMPLETE |

○ FAQ
○ Refer a friend

FIG. 9J

| REPORTS/ SCORES | MONITORING | NOTIFICATIONS | IDENTITY THEFT | ARCHIVES | YOUR INTEREST RATES | ACCOUNT |
|---|---|---|---|---|---|---|

CREDITWATCH   ⊙ HOME   ⊞ LEARN MORE   ⊕ SECURITY   ⊕ PRIVACY

ID THEFT NOTIFICATIONS DETAILS

| | |
|---|---|
| ID THEFT NOTIFICATION DATE: | JUNE, 2003 |
| POLICE DEPT. NOTIFIED: | 1123 MAIN STR. SAN SIMEON, CA SAN SIMEON METRO POLICE DEPT. |
| TRANS UNION NOTIFIED: | YES |
| EXPERIAN NOTIFIED: | YES |
| EQUIFAX NOTIFIED: | NO |
| CREDIT GRANTORS NOTIFIED: | CAPITAL ONE - 1816 OCEAN AVE SAINT PETERSBURG, NY 89000 |
| FBI/FTC CONSUMER SENTINEL NOTIFIED: | YES |

VIEW ID THEFT QUESTIONNAIRE DETAILS

Identity Theft is on the rise. Make sure you are regularly checking for the warning signs that you've become a victim!

Clean that credit report! It's vital to stay on top of your credit and make sure there are no inaccuracies in your file. Click here to make sure your file is up to date.

○ FAQ
○ Refer a friend

FIG. 9K

| REPORTS/ SCORES | MONITORING | NOTIFICATIONS | IDENTITY THEFT | ARCHIVES | YOUR INTEREST RATES | ACCOUNT |

CREDITWATCH

① HOME   ⊞ LEARN MORE   ④ SECURITY   ② PRIVACY

ID THEFT NOTIFICATION DETAILS

Identity Theft is on the rise. Make sure you are regularly checking for <u>the warning signs</u> that you've become a victim!

Clean that credit report! It's vital to stay on top of your credit and make sure there are no inaccuracies in your file. <u>Click here</u> to make sure your file is up to date.

| SECTION 1: | PERSONAL INFO |
| SECTION 2: | COMPLAINT OVERVIW |
| SECTION 3: | COMPLAINT DETAILS |
| SECTION 4: | ID THEFT INFO |
| SECTION 5: | PROBLEMS WITH COMPANIES | o <u>FAQ</u>
o <u>Refer a friend</u>

FIG. 9L

| REPORTS/ SCORES | MONITORING | NOTIFICATIONS | IDENTITY THEFT | ARCHIVES | YOUR INTEREST RATES | ACCOUNT |
|---|---|---|---|---|---|---|

CREDITWATCH    ⊙ HOME    ⊞ LEARN MORE    ⊕ SECURITY    ⊘ PRIVACY

ID THEFT DETAILS

PERSONAL INFORMATION

Identity Theft is on the rise. Make sure you are regularly checking for the warning signs that you've become a victim!

Clean that credit report! It's vital to stay on top of your credit and make sure there are no inaccuracies in your file. Click here to make sure your file is up to date.

○ FAQ
○ Refer a friend

| FIRST NAME: | JOHN |
|---|---|
| LAST NAME: | SHINN |
| ADDRESS: | 2865 SE 101 ST AV, PORTLAND, DE 97011 |
| HOME PHONE: | 323-998-0989 |
| WORK PHONE: | 818-556-8765 |
| SOCIAL SECURITY NUMBER: | 111-22-3333 |
| DATE OF BIRTH: | 12/31/65 |
| EMAIL ADDRESS: | JOHN.SHINN@AOL.COM |

--BACK--

FIG. 9M

COMPLAINT OVERVIEW

- TYPES OF IDENTITY THEFT YOU HAVE EXPERIENCED.
- --CREDIT CARDS
- SUSPECTED USE OF THE INTERNET TO OPEN THE ACCOUNT OR PURCHASE THE GOODS OR SERVICES
- --YES
- DESCRIPTION OF COMPLAINT
- YOUR DESCRIPTION OF HOW IT HAPPENED

--BACK--

DETAILS OF THE IDENTITY THEFT

FIG. 9N

| REPORTS/SCORES | MONITORING | NOTIFICATIONS | IDENTITY THEFT | ARCHIVES | YOUR INTEREST RATES | ACCOUNT |
|---|---|---|---|---|---|---|

CREDITWATCH  ⊚ HOME   ⊞ LEARN MORE   ⊛ SECURITY   ⊘ PRIVACY

Identity Theft is on the rise. Make sure you are regularly checking for the warning signs that you've become a victim!

YOUR INTEREST RATES
HOME LOAN INTEREST RATES

BASED ON YOUR MOST RECENT SCORE OF X, THE FOLLOWING ARE ESTIMATED AVAILABLE INTEREST RATES FOR HOME LOANS IN YOUR AREA.

NEW PURCHASE
FOR PROPERTIES UP TO $200,000

| INSTITUTION | 30 YEAR | | 15 YEAR | | 1 YEAR ARM | |
|---|---|---|---|---|---|---|
| | APR | PTS | APR | PTS | APR | PTS |
| COUNTRYWIDE | 6.28% | 0.8 | 5.60% | 0.8 | 3.84% | 0.7 |
| FIRST NATIONAL BANK OF OMAHA | 6.45% | 0.5 | 6.0% | 0.5 | 3.75% | 0.8 |
| DI TECH FUNDING | 6.375% | 1.0 | 5.95% | 0.8 | 3.75% | 1.0 |

Clean that credit report! It's vital to stay on top of your credit and make sure there are no inaccuracies in your file. Click here to make sure your file is up to date.

FOR PROPERTIES OVER $200,000

REFINANCE

| INSTITUTION | 30 YEAR | | 15 YEAR | | 1 YEAR ARM | |
|---|---|---|---|---|---|---|
| | APR | PTS | APR | PTS | APR | PTS |
| COUNTRYWIDE | 6.28% | 0.8 | 5.60% | 0.8 | 3.84% | 0.7 |
| FIRST NATIONAL BANK OF OMAHA | 6.45% | 0.5 | 6.0% | 0.5 | 3.75% | 0.8 |
| DI TECH FUNDS | 6.375% | 1.0 | 5.95% | 0.8 | 3.75% | 1.0 | o FAQ
o Refer a friend

FIG. 11

| REPORTS/ SCORES | MONITORING | NOTIFICATIONS | IDENTITY THEFT | ARCHIVES | YOUR INTEREST RATES | ACCOUNT |
|---|---|---|---|---|---|---|

CREDITWATCH   ⓘ HOME   ⓘ LEARN MORE   ⓘ SECURITY   ⓘ PRIVACY

MODIFY YOUR ACCOUNT PROFILE

Identity Theft is on the rise. Make sure you are regularly checking for the warning signs that you've become a victim!

Clean that credit report! It's vital to stay on top of your credit and make sure there are no inaccuracies in your file. Click here to make sure your file is up to date.

o <u>FAQ</u>
o <u>Refer a friend</u>

Personal Information:
Name: John Shirrn
To Change Name or Marital Status, <u>click here</u>
Address:
   E-mail: john.shirrn@atyourplace.com
   Daytime Phone Number: (800) 999-1212
   Evening Phone number: (800) 343-5656
   Current Address: 5090 Goose Str San Valley, S7G 9OP UK
To Change Address Information, <u>click here</u>

Security Information:
   Email: john@youremail.com
   Date of Birth: 09/12/65 (DD/MM/YY)
   Mothers Maiden Name: hilda
   User ID: jonnysinny
   Password: 1milroses
   Your security question: What is my favorite flower?
   Your answer to security question: lilac
To Change Security Information, <u>click here</u>

Credit Card Information:
   Credit Card: Discover
   Card Number: 4111111111111111

FIG. 14

SYSTEMS AND METHODS OF ON-LINE CREDIT INFORMATION MONITORING AND CONTROL

CROSS-REFERENCE TO RELATED APPLICATIONS

The present application is a continuation of U.S. patent application Ser. No. 12/874,364, filed Sep. 2, 2010 and entitled METHOD OF ON-LINE CREDIT INFORMATION MONITORING AND CONTROL, which is a continuation of U.S. patent application Ser. No. 10/665,244, filed Sep. 20, 2003, now U.S. Pat. No. 7,792,715, entitled METHOD OF ON-LINE CREDIT INFORMATION MONITORING AND CONTROL, which claims the benefit of priority to U.S. Prov. Pat. App. No. 60/412,355, filed Sep. 21, 2002, entitled ON-LINE SYSTEM AND METHOD FOR CREDIT MONITORING AND CONTROL. All of the aforementioned applications are hereby incorporated by reference in their entireties.

BACKGROUND

The invention relates to the field of credit information monitoring and control and, in particular, to a method for monitoring and control of an individual's credit information by use of the Internet.

Traditionally the typical method for obtaining one's credit information was to send a written request for a credit report to each credit reporting bureau and provide identifying proof of identity which, in most cases, was a utility bill or tax bill. Recently the credit report has been available for purchase online. Once the credit report was obtained and a discrepancy or error was found in the information, the individual had to request investigation of the discrepant or erroneous credit information either through the credit bureau or directly to the offending credit grantor organization, such as a department store or bank. This was a time consuming method. An improvement to this method was to use a credit watch, or credit monitoring organization that would monitor the individual's credit reports on file at a credit bureau. The credit watch organization would send reports to the individual if certain types of information appeared in the credit history. Examples of the type of information that would trigger a report are derogatory items, change of address and whether a third party requested a credit report. While this method provided an up-to-date status of the individual's credit history, the individual was still left with the job of contacting the individual creditor or bank to report errors or discrepancies and to request appropriate investigations.

In applicant's co-pending application Ser. No. 09/846,616 "Card Management System and Method Therefor" filed on May 1, 2001, a credit card management system is disclosed and is herewith incorporated into this application by reference. This invention is a method and system for on-line card management, wherein the card is issued to a card user by a card issuing organization. The card user interfaces with a card management organization via the card user's own computer through the Internet to a computer system within the card management organization. This system is discussed in more detail in the detailed description section because it is incorporated into the subject invention.

Thus, it is a primary object of the invention to provide to provide a method of on-line credit information monitoring and control.

It is another object of the invention to provide an on-line credit information monitoring method that allows an individual to obtain the individual's credit report from the credit reporting bureaus, to challenge any discrepancies or errors in the credit report, and to initiate time, and date stamped notifications to affected creditors to request remedial action.

It is a further object of the invention to provide an on-line credit information monitoring method that allows an individual who finds or suspects identity theft to initiate time and date stamped notifications to affected creditors and cognizant government agencies.

It is a further object of the system to provide an on-line credit information monitoring method which allows an individual to access time and date stamped notifications initiated by the individual to affected creditors and government agencies.

Another object of the invention is to provide an on-line credit information monitoring protocol that can determine the hypothetical interest rate that an individual should pay for a specific type of loan based on the individual's credit information.

SUMMARY

The invention is a method of on-line credit information monitoring and control designed to provide an individual with the ability to maintain the individual's credit information for the purpose of protecting against errors and misuse, and for availing the individual of the best available credit consistent with the individual's credit information. In general, the system and method allows an individual using the individual's own computer terminal to access a computer system in a computer network, such as the Internet, to monitor, request, and record within the computer system, numerous actions initiated by the individual regarding the individual's own credit information.

In detail, a method of on-line monitoring and control of an individual's credit information, which includes the steps of:

1. The individual accesses a computer system in a computer network. This is typically accomplished by the individual accessing the Internet by use of the individual's own computer and contacting the credit management computer system.
2. Via the computer system, the individual then requests actions regarding the individual's credit information. These actions will include obtaining a copy of the individual's credit report from each of the national bureaus, or a combined copy in a merged format that shows the data from each of the national bureaus. These actions will also include notification of specific items of the credit report, such as: credit information from creditors that can have an adverse affect on the individual's credit, requests from third parties for copies of the individual's credit report, and changes of address as reported to the bureaus.
3. Contacting the appropriate organization by the computer system and requesting the organization to take appropriate remedial action. Here the computer system completes the request initiated by the individual. Through interaction with the computer system, an individual can communicate with a creditor to dispute an information item or items. The individual can also request the computer system to electronically notify the appropriate government agencies should an identity theft situation occur or appear to be imminent such as with an unauthorized address change, or application for credit that the individual did not authorize.
4. Informing the individual that the notification has been made.

The invention further includes a computer program for interpreting the individual's credit information and providing hypothetical interest rate advice.

The invention further includes a computer program to request credit bureaus to delete inaccurate information if investigation fails to begin within the 30-day period required by law. In addition, a computer program is included that date and time stamps, stores, and maintains all actions taken by the individual.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 3A is a computer terminal screen for registering a new member. This screen includes general information.

FIG. 3B is a computer terminal screen for registering additional information for a new member. This screen includes security information.

FIG. 3C is a computer terminal screen presenting the member with program options.

FIG. 5A is a computer terminal screen for requesting a new credit report.

FIG. 5B is a computer terminal screen displaying a credit report.

FIG. 5C is a computer terminal screen displaying a credit score.

FIG. 5D is a computer terminal screen displaying a form to report an inaccuracy in a credit report.

FIG. 7A is a computer terminal screen displaying results of trade lines of credit monitoring report.

FIG. 7B is a computer terminal screen displaying address monitoring.

FIG. 7C is a computer terminal screen displaying employment information.

FIG. 7D is a computer terminal screen displaying Inquiries information.

FIG. 7E is a computer terminal screen displaying the public record of the individual.

FIG. 9A is a computer terminal screen displaying an identity theft questionnaire, in particular, personal information.

FIG. 9B a is a computer terminal screen displaying an identity theft questionnaire, in particular, complaint overview information.

FIG. 9C is a computer terminal screen displaying an identity theft questionnaire, in particular, complaint details.

FIG. 9D is a computer terminal screen displaying an identity theft questionnaire, in particular, further complaint details.

FIG. 9E is a computer terminal screen displaying an identity theft questionnaire, in particular, problems with companies.

FIG. 9F is a computer terminal screen displaying an identity theft questionnaire, in particular, a review and submit screen.

FIG. 9G is a computer terminal screen displaying an identity theft questionnaire, in particular, reporting instructions.

FIG. 9H is a computer terminal screen displaying an identity theft questionnaire, in particular, a form letter for reporting identity theft.

FIG. 9I is a computer terminal screen displaying an identity theft questionnaire, in particular, the second page of the form letter shown in FIG. 9H.

FIG. 9J is a computer terminal screen displaying an identity theft questionnaire, in particular, status of reports on identity theft.

FIG. 9K is a computer terminal screen displaying an identity theft questionnaire, in particular, identity theft notification details.

FIG. 9L is a computer terminal screen displaying an identity theft questionnaire, in particular, identity theft notification overview screen.

FIG. 9M is a computer terminal screen displaying an identity theft questionnaire, in particular, personal Information record.

FIG. 9N is a computer terminal screen displaying an identity theft questionnaire, in particular, identity theft notification details.

FIG. 11 is a computer terminal screen displaying the expected interest rates and individual should expect to pay given his or her credit rating score.

FIG. 14 is a computer terminal screen for displaying account information.

DETAILED DESCRIPTION

Figure 1:
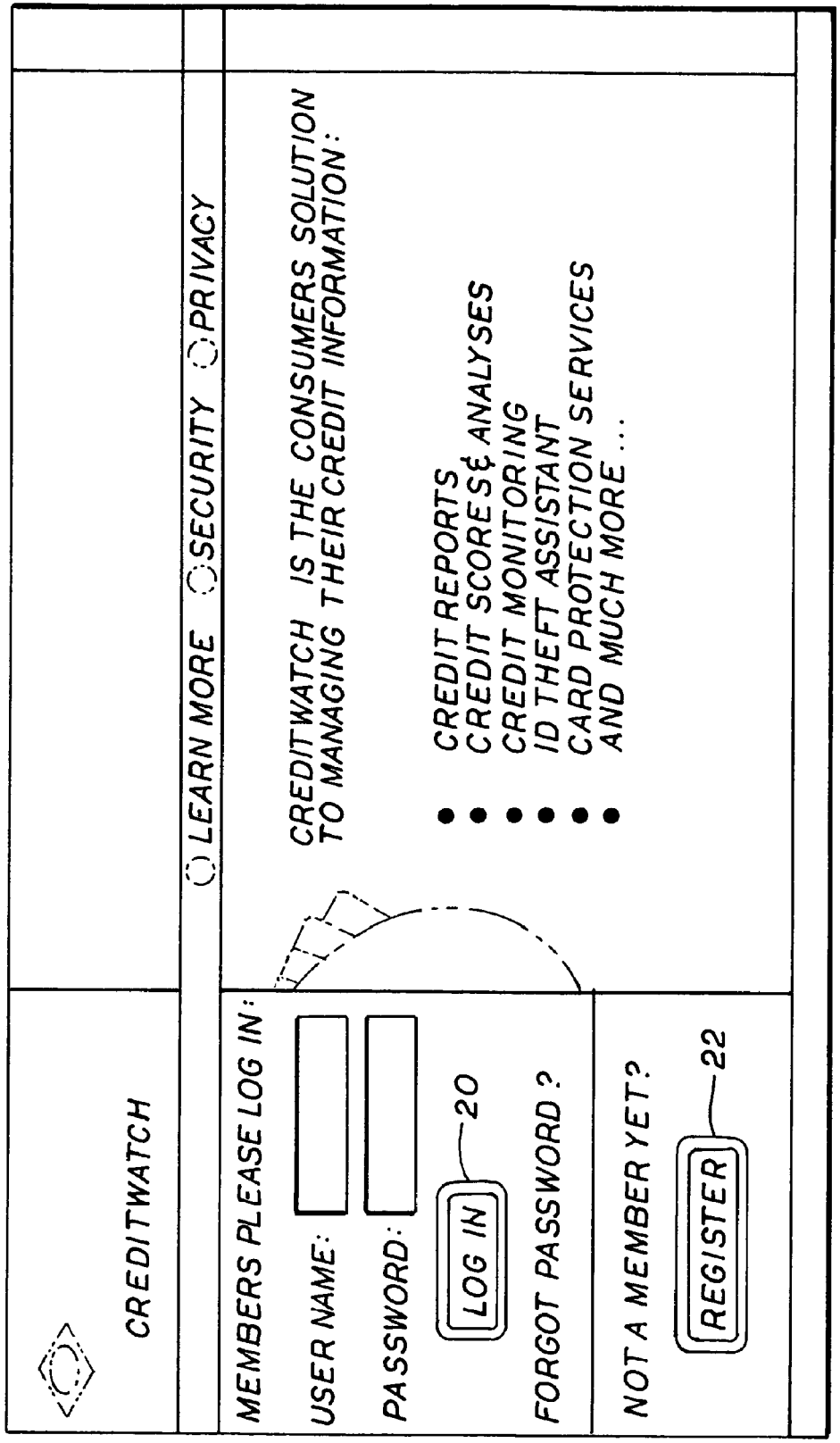
FIG. 1 is a computer terminal screen by which an individual can log-in or register as a new member
Figure 2:
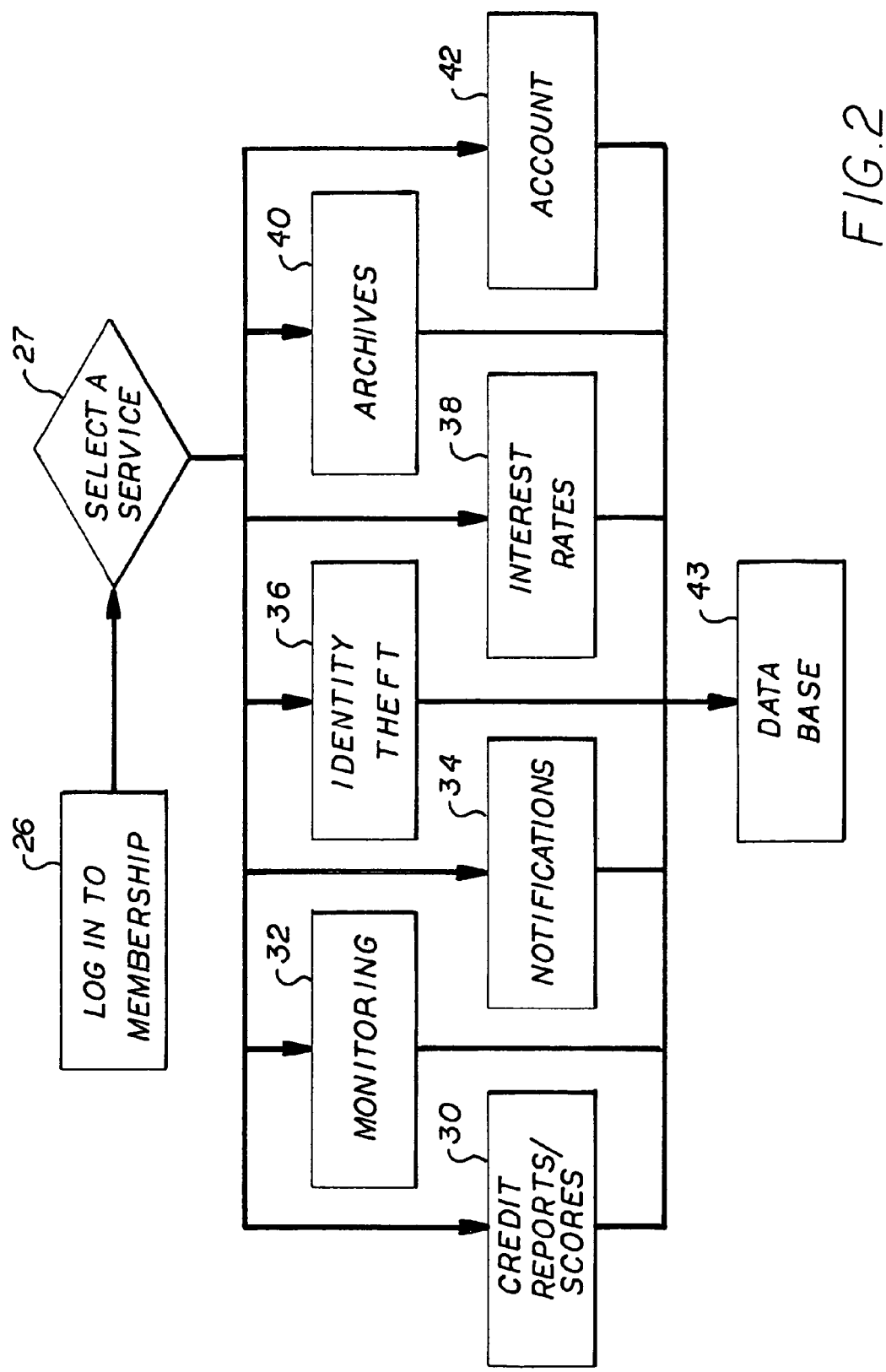
FIG. 2 is a top-level flow chart of the credit card computer program.

FIG. 1 is the opening computer screen for the program and FIG. 2 is a top-level flow chart for the computer program. Referring to FIGS. 1 and 2, the individual logs-in by entering their name and a password and pressing the log-in button 20. The individual can also register by clicking on the register button 22. However, the registration process is typical, involving entering ones name, address, and other pertinent information as illustrated in FIGS. 3A and 3B. Thus this process need not be discussed further. After logging-in, the computer screen shown in FIG. 3C appears and displays all the available features of the program. Additionally, an account summary automatically appears (this summary which will be discussed later).

Figure 4:
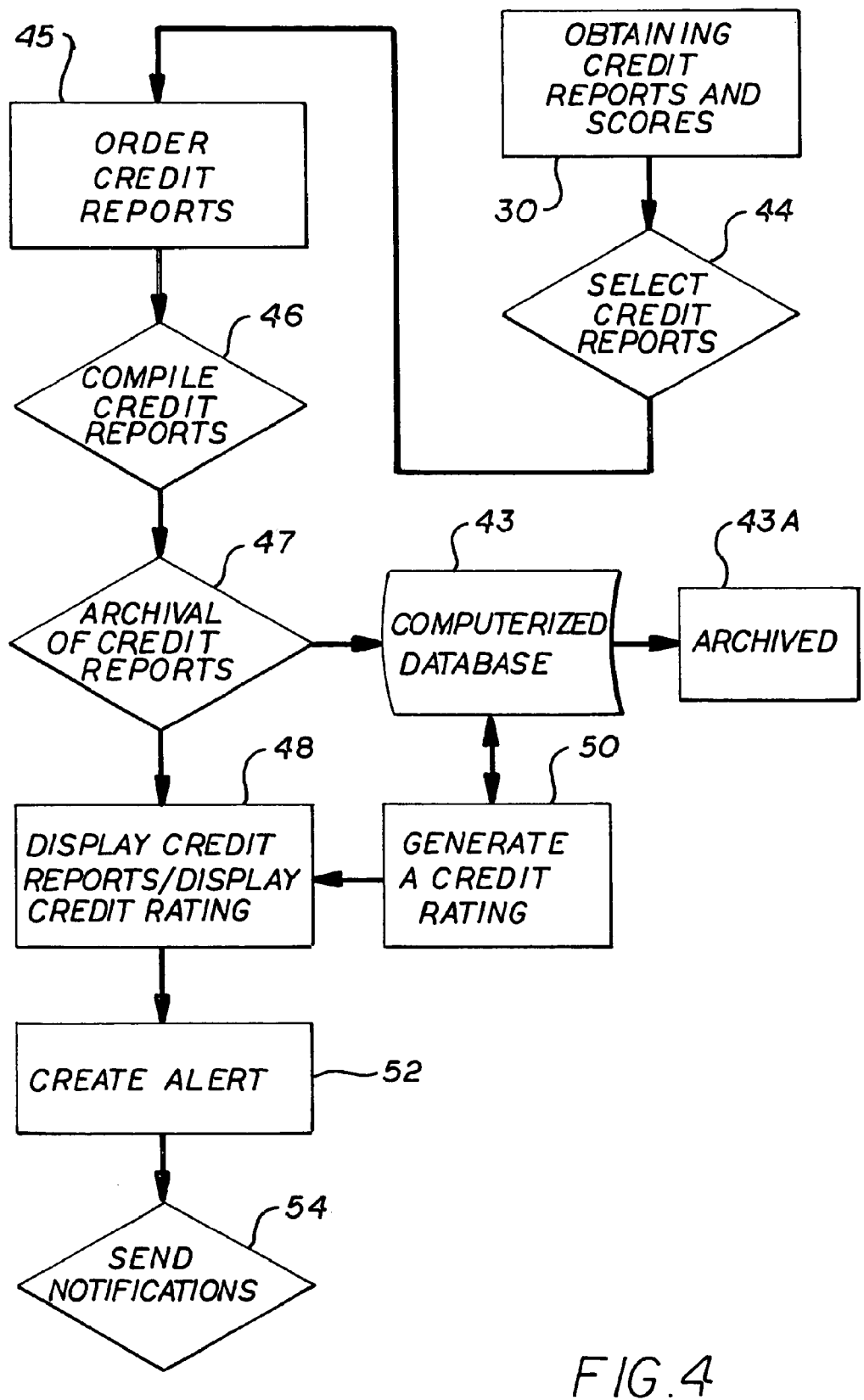
FIG. 4 is a flow chart of the computer program for requesting credit reports and credit score.

Referring to FIGS. 2, 3C and 4, the following are the steps for obtaining a credit report:

Step 20—Log In.

Figure 5E:
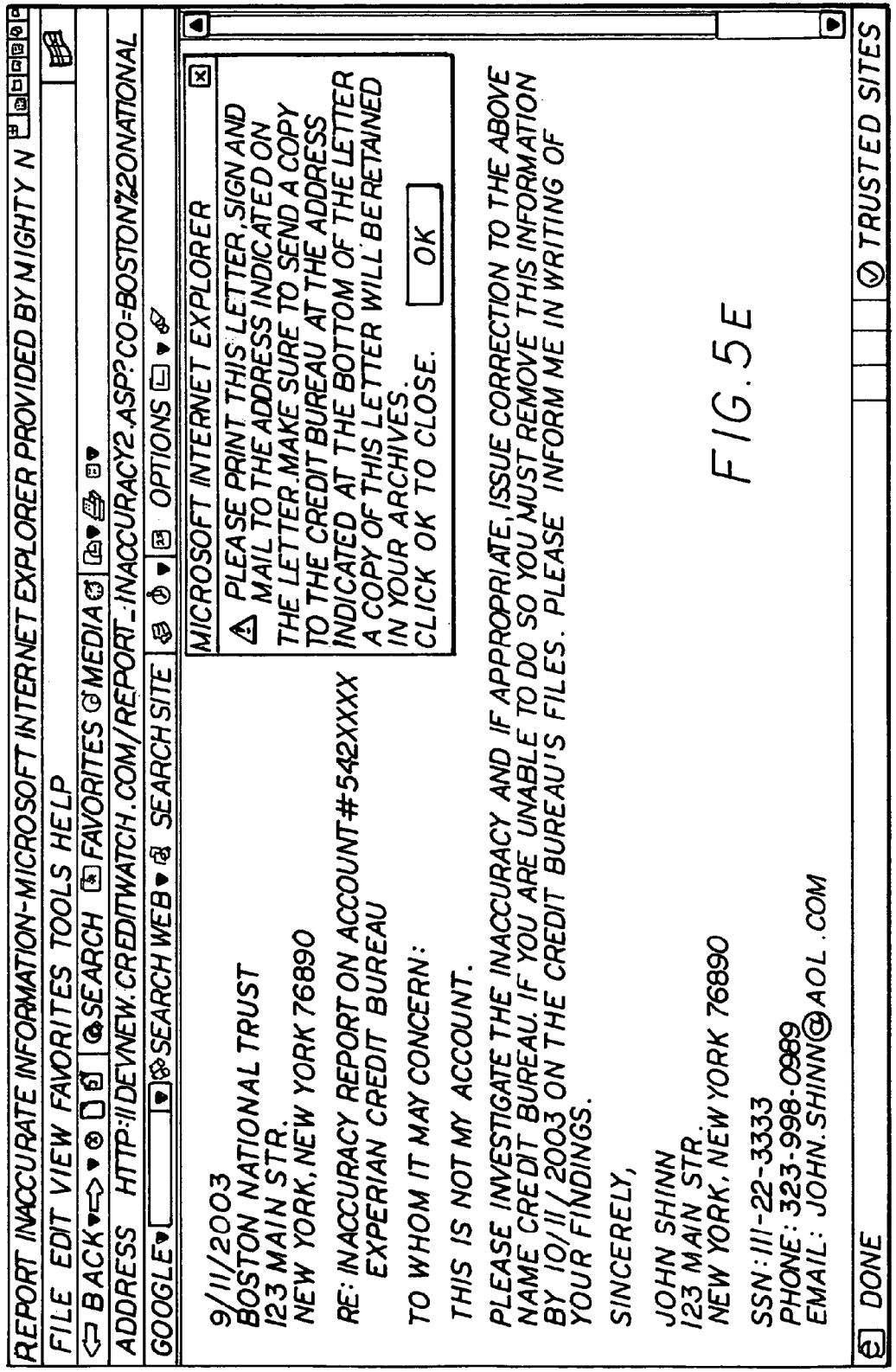
FIG. 5E is a computer terminal screen displaying a form letter to a creditor.

Step 27—Select A Service—These include the steps of obtaining credit reports and scores 30, monitoring credit 32, credit card monitoring, including reporting lost cards 34, identity theft reporting 36, compute interest rates, archival of information 40 and account information 42. All the information generated is archived in a computerized database 43. In this instance button 30 is "clicked" on. Step 30—Obtaining Credit Reports and Scores—It can be seen that the individual can monitor various credit reporting bureaus and have their reports and credit rating displayed. Step 30 therefore includes the steps of: Step 44—Select Credit Reports—The three major credit reporting bureaus, Experian Corporation, Equifax Corporation and TransUnion Corporation can be contacted and a credit report purchased. The computer screen in FIG. 5A appears and the individual can then order a new report. Step 45—Order Credit Reports—Orders for credit reports are made to the credit reporting bureaus. A typical screen to order such reports is shown in FIG. 5B. Step 46—Compile Credit Reports—If more than one credit report is purchased, then the reports are merged. Step 47—Archival of Credit Report—At this point the credit report is added to the database 43 and archived (Step 43A) Step 48—Display Credit Report—The credit report(s) are presented to the individual for review via the Internet. The typical report is shown in FIG. 5B. The credit reports from step 48 can be used to develop a credit rating. Step 50—Generate A Credit Rating— This information is useful in determining a interest rate that the individual would expect to pay when securing a loan. In this step a credit score is computed. This can be provided by the credit reporting bureau or an independent organization or an independent organization. Step 48—Display Credit Report and Credit Score—The credit rating is provided to the individual over the Internet. The computer terminal screen for displaying a credit score is illustrated in FIG. 5C. Step 52—Create Alert—FIG. 5B displays the Computer screen, which displays the report(s). Note that a Report Inaccuracy Button 53 appears. Step 54—Send Notifications—Automatic inquires are made to the credit bureaus and credit by pressing Button 53.

Figure 6:
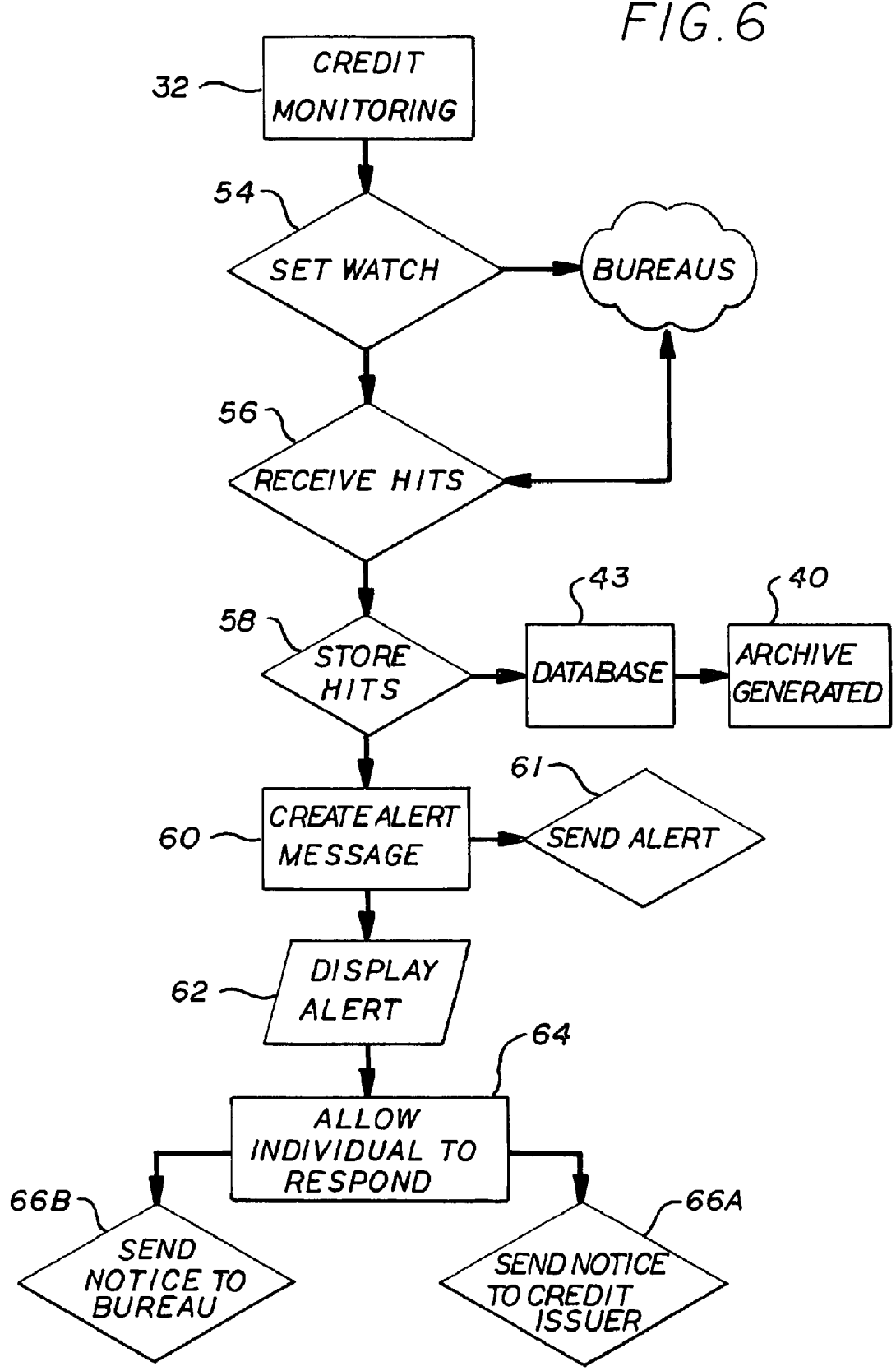
FIG. 6 is a detailed flow chart of the computer program for credit monitoring.

Referring now to FIGS. 3C and 6, which is a detailed flowchart of the credit monitoring program, the individual can continuously monitor the individual's credit history. After clicking on the credit-monitoring button 32, the following program is initiated.

Step 55—Set Watch—This initiates monitoring of credit bureau reports. Step 56—Receive Hits—The hits (changes to credit report) are gathered. Step 58—Store Hits in database 43 Step 60—Create Alert Message—Alert message for E-mail is prepared. Step 61—Send Alert—E-mail message sent to individual. Step 62—Display Alert—Alert also put on individuals web site. Step 64—Allow Ind. To Respond— Initiate individual's notification Step 66A—Send Notice to Credit Issuer—Individual notice sent from user to credit issuer. Step 66B—Send Notice To Bureau—Individual notice send to credit reporting bureau(s).

FIG. 7A shows a computer screen for monitoring trade lines. FIG. 7BB is a computer screen that allows the user to monitor address changes. FIG. 7C shows the computer screen for employment history FIG. 7D shows the computer screen for monitoring inquires. FIG. 7E shows the screen for monitoring public records In FIGS. 1 and 2, the Notifications Step 34 is accomplished by the process disclosed in U.S. patent application Ser. No. 09/846,616 "Card Management System and Method Therefor" filed on May 1, 2001, a credit card management system was disclosed and is herewith incorporated into this application by reference. This invention is a method and system for on-line card management, wherein the card is issued to a card user by a card issuing organization. The card user interfaces with a card management organization via the card user's own computer through the Internet to a computer system within the card management organization. The computer system includes a computer program that processes the request concerning a card and the card issuer is informed of the card user's request via the Internet system. The computer program thereafter informs the card user that the card issuer has received notice. This invention allowed an individual to contact a card issuer about a credit card billing dispute.

Figure 8:
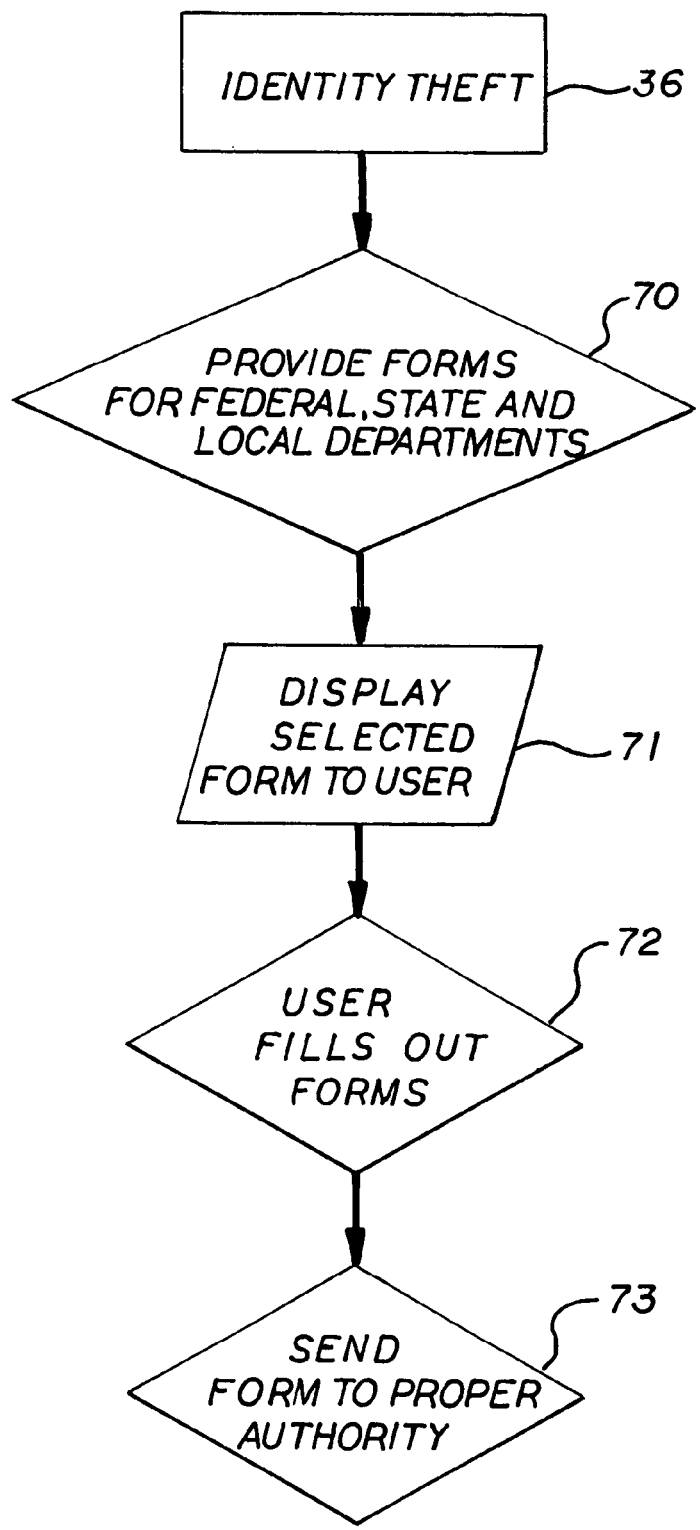
FIG. 8 is a detailed flow chart of the computer program for reporting and monitoring identity theft.

Still referring to FIG. 3C and additionally to FIG. 8, which is a computer flow chart to handle Identity Theft 36. After "clicking" on Identity theft button on the Screen in FIG. 3C, the following steps are undertaken by a computer program.

Step 70—Provide Forms—A generic form for Federal, State and local law enforcement departments is provided. Step 71—Display Selected Form—Here the form that is required is displayed as requested.

Step 72—User Fills Out Form.

Step 73—Show Printable Form and Instructions.

The following computer terminal screens are available: FIG. 9A is a computer terminal screen displaying an identity theft questionnaire, in particular, personal information. FIG. 9B is a computer terminal screen displaying an identity theft questionnaire, in particular, complaint overview information. FIG. 9C is a computer terminal screen displaying an identity theft questionnaire, in particular, complaint details. FIG. 9D is a computer terminal screen displaying an identity theft questionnaire, in particular, further complaint details. FIG. 9E is a computer terminal screen displaying an identity theft questionnaire, in particular, problems with companies. FIG. 9F is a computer terminal screen displaying an identity theft questionnaire, in particular, a review and submit screen.

FIG. 9G is a computer terminal screen displaying an identity theft questionnaire, in particular, reporting instructions. FIG. 9H is a computer terminal screen displaying an identity theft questionnaire, in particular, a customized form letter for reporting identity theft. FIG. 9I is a computer terminal screen displaying an identity theft questionnaire, in particular, the second page of the form letter shown in FIG. 9H. FIG. 9J is a computer terminal screen displaying an identity theft questionnaire, in particular, status of reports on identity theft. FIG. 9K is a computer terminal screen displaying an identity theft questionnaire, in particular, identity theft notification details. FIG. 9L is a computer terminal screen displaying an identity theft questionnaire, in particular, identity theft notification overview screen. FIG. 9M is a computer terminal screen displaying an identity theft questionnaire, in particular, personal Information record. FIG. 9N is a computer terminal screen displaying an identity theft questionnaire, in particular, identity theft notification details.

Figure 10:
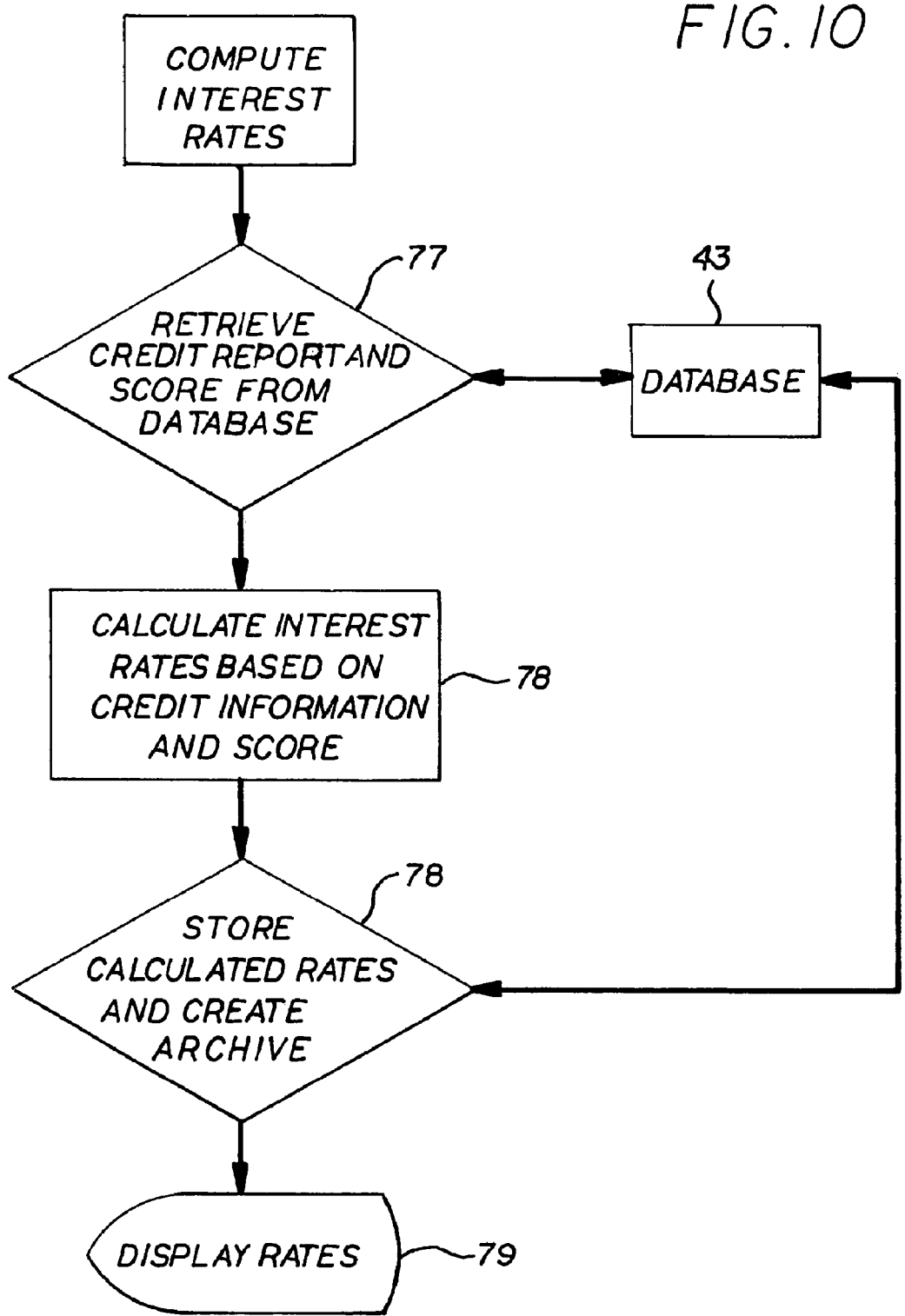
FIG. 10 is a flow chart for a computer program to compute interest rates.

Referring to FIG. 3C and FIG. 10 which is a flow chart for the computer program to compute interest rates an individual should expect to pay based on his or hers credit score.

Step 76—Retrieve Credit Ratinq—The database is accessed to retrieve the rating. Step 77—Calculate Interest Rate—Rates for a house, car, personal loan, savings or credit card are computed Step 78—Store Interest Data Step—79 Display Interest Rate Data. FIG. 11 is a typical report of the interest rates and individual should expect to pay given their latest credit rating.

Figure 12:
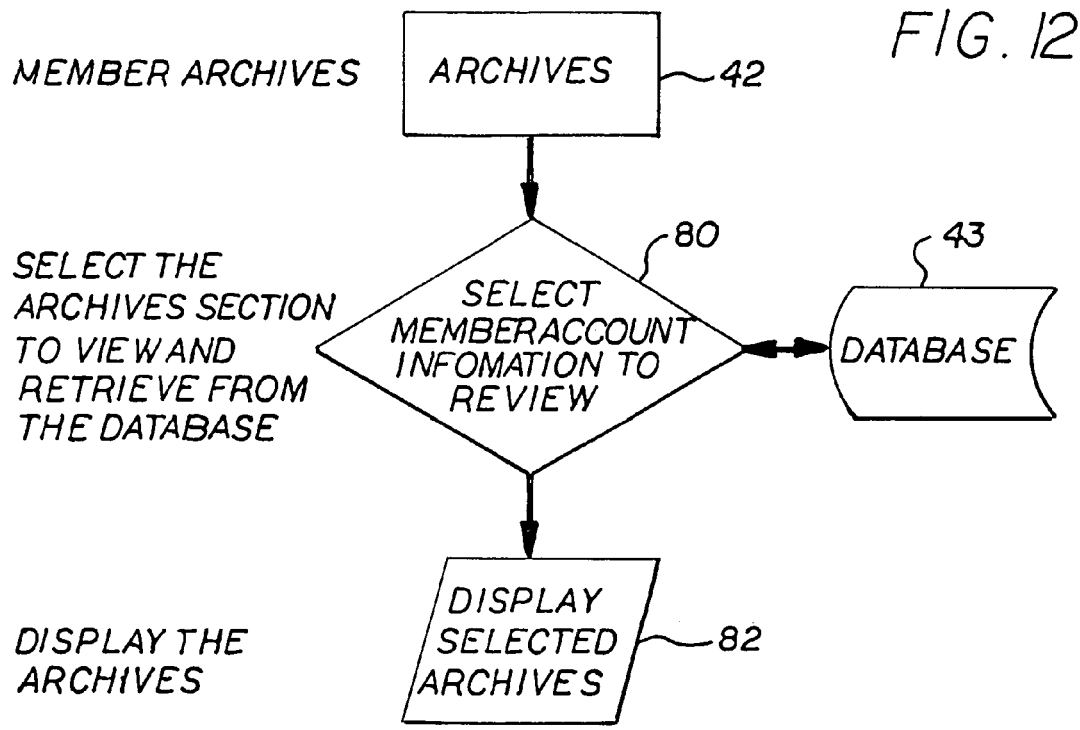
FIG. 12 is a flow chart for a computer program to record activities.

Archives can be entered to obtain an individual's records and a flow chart for the computer to accomplish this function is provided in FIG. 12.

Step 80—Select Member Account—The data base is entered to retrieve data. Step 82—Display Selected Archived data.

Figure 13:
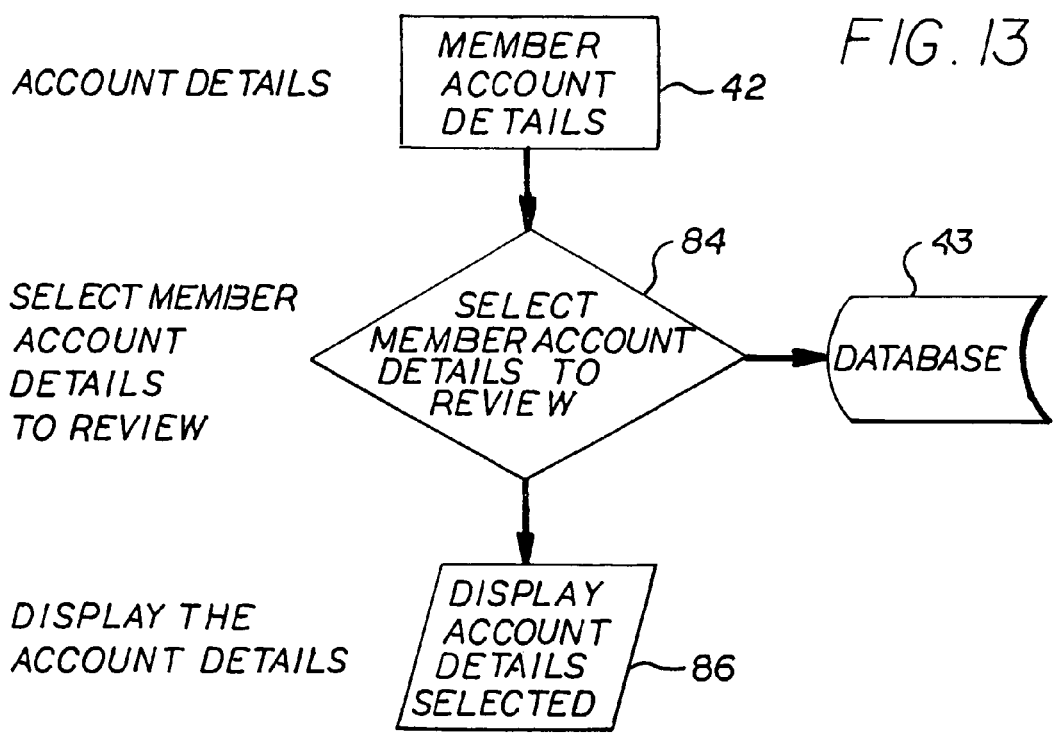
FIG. 13 is a flow chart for a computer program for providing an individual's account details.

FIG. 13 a flow chart for the computer program to provide an individual's account information.

Step 84—Select Member Account Details

Step 86—Display Account Details—FIG. 14 is a printout of typical account details.

Thus it can be seen that the computer program and associated screens can obtain credit reports and scores, monitor credit, perform notifications, handle identity theft, compute interest rates, view archived data, and modify account details.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the credit reporting industry.

What is claimed is:

1. A computing system for on-line monitoring and on-line interaction and control of credit information from a credit report of a consumer of credit, the system comprising:
one or more hardware processors configured to execute instructions in order to cause the computing system to:
access credit information relating to a consumer, the credit information comprising a plurality of credit items, each credit item being associated with a specific credit service;
provide a user interface comprising a plurality of active links, each one of said active links being associated with a respective one of the plurality of credit items, wherein each of said active links is configured to enable the consumer to communicate directly with one of the credit services regarding one of the credit items associated with the active link; and
transmit the user interface to a computer of the consumer.

2. The computing system of claim 1, further configured to compute a credit score of the consumer based upon the credit information.

3. The computing system of claim 2, further configured to transmit the credit information and the credit score to the consumer.

4. The computing system of claim 2, further configured to store the credit information and the credit score in a computer-readable storage medium.

5. The computing system of claim 1, further configured to access updated credit information on a periodic basis, and further configured to determine changes in the updated credit information.

6. The computing system of claim 5, further configured to archive the updated credit information.

7. The computing system of claim 5, further configured to create an alert in response to a determination of changes in the updated credit information.

8. The computing system of claim 7, further configured to transmit the alert to the consumer.

9. The computing system of claim 1, further configured to:
transmit, to the consumer, user interface data enabling the consumer to report an identity theft;
transmit, to the consumer, forms enabling the consumer to report the identity theft to selected organizations; and
receive completed forms from the consumer and provide the completed forms to the selected organizations.

10. The computing system of claim 1, further configured to compute expected interest rates based on the credit information relating to the consumer, and further configured to transmit the expected interest rates to the consumer.

11. The computing system of claim 1, further configured to archive the credit information relating to the consumer.

12. The computing system of claim 11, further configured to access the archived credit information.

13. The computing system of claim 1, further configured to provide a login interface enabling the consumer to log onto the system by a computer.

14. The computing system of claim 1, wherein the plurality of active links is a plurality of links to report inaccuracies of the credit items.

15. The computing system of claim 1, wherein the plurality of credit items is associated with the same credit service or with different credit services.

16. The computing system of claim 1, wherein each of the plurality of active links is associated with one credit item, and the server computer is further configured to generate a form for directly contacting at least one of the credit services via mail.

17. The computing system of claim 1, wherein the credit services are credit grantors.

18. The computing system of claim 1, wherein the credit services are credit bureaus.

19. The computing system of claim 1, wherein the user interface comprises one or more web pages and/or electronic communications.

20. A method of providing credit information to a user computer, the method comprising:
receiving, at a computing system, a request from a user computer, the request comprising identifying information relating to an individual;
gathering credit-related data associated with the individual based on receiving the identifying information relating to the individual, the credit-related data comprising one or more credit items associated with credit services;
constructing user interface data based on the gathered credit-related data, the user interface data configured to cause the display of a user interface comprising a plurality of links associated with a plurality of credit items, each of the plurality of links being configured to initiate a communication between the user computer and a credit service associated with a respective credit item associated with the link; and
transmitting the user interface data to the user computer.

21. The method of claim 20, wherein gathering the credit-related data associated with the individual comprises transmitting a request to a credit bureau via an electronic communications link, the request identifying the individual, and receiving credit report data from the credit bureau via the electronic communications link.

22. The method of claim 20, wherein the user interface data comprises web page data.

23. The method of claim 20, further comprising offering two or more of the following services by the server system: obtaining and tracking credit reports and/or scores, monitoring credit, reporting lost credit cards, identity theft reporting, calculating hypothetical interest rates that the consumer should pay for specific types of loans based on credit information of the consumer, and accessing credit information archived by the system.

24. The method of claim 20, wherein the plurality of links are configured to initiate requests for changes to the individual's credit information.

25. The method of claim 20, wherein the user interface comprises one or more web pages and/or electronic communications.

26. A method of automatically monitoring an individual's credit information, the method comprising:
  receiving, at a computing system, a request to monitor credit information associated with an individual, the request comprising identifying information relating to the individual;
  initiating a monitoring service in response to the received request, wherein initiating a monitoring service comprises periodically gathering, from a credit data repository, credit information associated with the individual based at least in part on the identifying information relating to the individual, the credit information comprising one or more credit items associated with credit issuers;
  identifying a change in the credit information received from the credit data repository;
  and providing an online alert message to the individual, the online alert message comprising data associated with the identified change in the credit information, the online alert message comprising a plurality of links associated with the credit items, each of the plurality of links being configured initiate a communication between the individual and a credit issuer associated with a respective credit item, the online alert message further configured to provide the user with information usable to communicate with the credit data repository.

27. The method of claim 26, wherein the credit data repository comprises a credit bureau.

28. The method of claim 26, wherein the credit issuers include a credit grantor.

29. The method of claim 26, wherein the credit issuers include a credit bureau.

30. The method of claim 26, wherein the credit issuers include the credit data repository.

31. The method of claim 26, wherein the online alert message comprises one or more web pages and/or electronic communications.

* * * * *

UNITED STATES PATENT AND TRADEMARK OFFICE
CERTIFICATE OF CORRECTION

PATENT NO.        : 8,195,549 B2
APPLICATION NO.   : 13/168736
DATED             : June 5, 2012
INVENTOR(S)       : Kasower Page 1 of 2

It is certified that error appears in the above-identified patent and that said Letters Patent is hereby corrected as shown below:

Sheet 3 of 36 (Fig. 3A) line 14, change "REQUIRED.THIS SERVISE" to --REQUIRED. THIS SERVICE--.

Sheet 3 of 36 (Fig. 3A) line 14, change "RESIDETS" to --RESIDENTS--.

Sheet 4 of 36 (Fig. 3B) line 29, change "PASWORD" to --PASSWORD--.

Sheet 5 of 36 (Fig. 3C) line 4, change "Idenity" to --Identity--.

Sheet 7 of 36 (Fig. 5A) line 4, change "Idenity" to --Identity--.

Sheet 7 of 36 (Fig. 5A) line 4, change "SECURIT" to --SECURITY--.

Sheet 7 of 36 (Fig. 5A) line 18, change "CURENT" to --CURRENT--.

Sheet 7 of 36 (Fig. 5A) line 19, change "ISNOT" to --IS NOT--.

Sheet 9 of 36 (Fig. 5C) line 4, change "IDENITITY" to --Identity--.

Sheet 9 of 36 (Fig. 5C) line 7, change "HIGHES" to --HIGHEST--.

Sheet 13 of 36 (Fig. 7A) line 4, change "Idenity" to --Identity--.

Sheet 13 of 36 (Fig 7A) line 11, change "SUBSCRBER" to --SUBSCRIBER--.

Sheet 13 of 36 (Fig. 7A) line 15, change "CURENT" to --CURRENT--.

Sheet 14 of 36 (Fig. 7B) line 4, change "Idenity" to --Identity--.

Sheet 15 of 36 (Fig. 7C) line 4, change "Idenity" to --Identity--.

Sheet 16 of 36 (Fig. 7C) line 4, change "Idenity" to --Identity--.

Sheet 17 of 36 (Fig. 7E) line 4, change "Idenity" to --Identity--.

Sheet 19 of 36 (Fig. 9A) line 4, change "Idenity" to --Identity--.

Sheet 20 of 36 (Fig. 9B) line 4, change "Idenity" to --Identity--.

Sheet 21 of 36 (Fig. 9C) line 4, change "Idenity" to --Identity--.

Sheet 22 of 36 (Fig. 9D) line 4, change "Idenity" to --Identity--.

Sheet 23 of 36 (Fig. 9E) line 4, change "Idenity" to --Identity--.

Signed and Sealed this
Twenty-third Day of October, 2012

David J. Kappos
*Director of the United States Patent and Trademark Office*

CERTIFICATE OF CORRECTION (continued)
U.S. Pat. No. 8,195,549 B2

Sheet 24 of 36 (Fig. 9F) line 4, change "Idenitity" to --Identify--.

Sheet 28 of 36 (Fig. 9J) line 4, change "Idenitity" to --Identity--.

Sheet 29 of 36 (Fig. 9K) line 4, change "Idenitity" to --Identity--.

Sheet 30 of 36 (Fig. 9L) line 4, change "Idenitity" to --Identity--.

Sheet 30 of 36 (Fig. 9L) line 10, change "OVERVIW" to --OVERVIEW--.

Sheet 31 of 36 (Fig. 9M) line 4, change "Idenitity" to --Identity--.

Sheet 32 of 36 (Fig. 9N) line 2, change "EXPEPIENCED." to --EXPERIENCED--.

Sheet 34 of 36 (Fig. 11) line 4, change "Idenitity" to --Identity--.

Sheet 35 of 36 (Box No. 80, Fig 12) line 2, change "MEMBERACCOUNT" to --MEMBER ACCOUNT--.

Sheet 35 of 36 (Box No. 80, Fig. 12) line 3, change "INFOMATION" to --INFORMATION--.

Sheet 36 of 36 (Fig 14) line 4, change "Idenitity" to --Identity--.

Sheet 36 of 36 (Fig. 14) line 21, change "MOTHERS" to --MOTHER'S--.

Column 2, line 3, change "time," to --time--.

Column 3, line 25, after "member" please insert --.--.

Column 3, line 55, change "Inquiries" to --inquiries--.

Column 3, line 63, after "9B" please delete "a".

Column 5, line 17, change "(Step 43A)" to --(Step 43A).--.

Column 5, line 43, change "43" to --43.--.

Column 5, line 47, change "notification" to --notification.--.

Column 5, line 52, change "7BB" to --7B--.

Column 6, line 51, change "Ratinq" to --Rating--.

Column 6, line 54, after "computed" insert --.--.

Column 6, line 55, after "Data" insert --.--.

Column 6, line 67, after "Details" insert --.--.

Column 10, line 3, in Claim 26, change "configured" to --configured to--.